US012412921B2

United States Patent
Dou et al.

(10) Patent No.: US 12,412,921 B2
(45) Date of Patent: Sep. 9, 2025

(54) POSITIVE ELECTRODE ACTIVE MATERIAL AND PREPARATION METHOD THEREOF, POSITIVE ELECTRODE PLATE, LITHIUM-ION SECONDARY BATTERY, AND APPARATUS CONTAINING SUCH LITHIUM-ION SECONDARY BATTERY

(71) Applicant: CONTEMPORARY AMPEREX TECHNOLOGY (HONG KONG) LIMITED, Hong Kong (CN)

(72) Inventors: Shushi Dou, Ningde (CN); Chunhua Hu, Ningde (CN); Yao Jiang, Ningde (CN); Qi Wu, Ningde (CN); Jinhua He, Ningde (CN); Bin Deng, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 661 days.

(21) Appl. No.: 17/682,258

(22) Filed: Feb. 28, 2022

(65) Prior Publication Data

US 2022/0181675 A1 Jun. 9, 2022

Related U.S. Application Data

(63) Continuation of application No. PCT/CN2020/112914, filed on Sep. 1, 2020.

(30) Foreign Application Priority Data

Sep. 2, 2019 (CN) .......................... 201910825311.4

(51) Int. Cl.
*H01M 4/36* (2006.01)
*C01G 53/44* (2025.01)
(Continued)

(52) U.S. Cl.
CPC ........ *H01M 10/0525* (2013.01); *C01G 53/44* (2013.01); *H01M 4/366* (2013.01);
(Continued)

(58) Field of Classification Search
CPC ... H01M 4/366; H01M 4/525; H01M 10/0525
See application file for complete search history.

(56) References Cited

U.S. PATENT DOCUMENTS

| 5,587,133 A | 12/1996 | Amatucci et al. |
| 2013/0247363 A1 | 9/2013 | Nelson et al. |

(Continued)

FOREIGN PATENT DOCUMENTS

| CN | 102593445 A | 7/2012 |
| CN | 103298249 A | 9/2013 |

(Continued)

OTHER PUBLICATIONS

Machine Translation of: CN 106711414A, Li et al., May 24, 2017.*

(Continued)

*Primary Examiner* — Kenneth J Douyette
(74) *Attorney, Agent, or Firm* — Ladas & Parry LLP

(57) ABSTRACT

This application discloses a positive electrode active material, including bulk particles and a coating layer applied on an exterior surface of each of the bulk particles, where the bulk particle includes a lithium composite oxide that contains element nickel and a doping element $M^1$, and the coating layer includes an oxide of element $M^2$. When the positive electrode active material is in a 11% delithiated state, average valences of element $M^1$ and $M^2$ are $\alpha^1$ and $\beta^1$, respectively; when the positive electrode active material is in a 78% delithiated state, average valences of element $M^1$ and $M^2$ are $\alpha^2$ and $\beta^2$, respectively; and $\alpha^2 > \alpha^1$, $\beta^1 = \beta^2$. Element $M^1$ includes one or more of Si, Ti, Cr, Mo, V, Se, (Continued)

Nb, Ru, Rh, Pd, Sb, Te, Ce, and W, and element $M^2$ is selected from one or more of Mg, Al, Ca, Zr, Zn, Y, and B.

18 Claims, 5 Drawing Sheets

(51) Int. Cl.
    *H01M 4/52*         (2010.01)
    *H01M 4/525*       (2010.01)
    *H01M 10/0525*   (2010.01)
    *H01M 4/02*         (2006.01)

(52) U.S. Cl.
    CPC ......... *H01M 4/525* (2013.01); *C01P 2002/52* (2013.01); *C01P 2006/10* (2013.01); *C01P 2006/11* (2013.01); *C01P 2006/12* (2013.01); *C01P 2006/40* (2013.01); *H01M 2004/028* (2013.01)

(56) References Cited

U.S. PATENT DOCUMENTS

2016/0336595 A1   11/2016   Choi et al.
2018/0287135 A1   10/2018   Shin et al.

FOREIGN PATENT DOCUMENTS

| | | |
|---|---|---|
| CN | 104282903 A | 1/2015 |
| CN | 104409700 A | 3/2015 |
| CN | 106711414 A | 5/2017 |
| CN | 107112531 A | 8/2017 |
| CN | 107851794 A | 3/2018 |
| CN | 109428077 A | 3/2018 |
| CN | 108028373 A | 5/2018 |
| CN | 108123114 A | 6/2018 |
| CN | 108847477 A | 11/2018 |
| CN | 110176579 A | 8/2019 |
| WO | 2006027925 A2 | 3/2006 |
| WO | 2015115699 | 8/2015 |

OTHER PUBLICATIONS

Notification to Grant Patent Right for Invention for China Patent Application 201910825311.4 issued Dec. 8, 2021, 4 pages.
Second Office Action for China Patent Application 201910825311.4 issued Sep. 15, 2021, 9 pages.
Extended European Search Report for PCT/CN2020112914 issued Dec. 6, 2022, 9 pages.
Gui, Xuan et al., "Electronic Structure of LiMn2O4 and LiNi0.5Mn1.5O4 Positive-electrode Materials for Lithium-ion Battery," J. of Anhui University of Technology(Natural Science), Jun. 2018, 5 pages.
Zheng, Zheng et al., "Tuning of Thermal Stability in Layered Li(NixMnyCoz)O," JJ. Am. Chem. Soc., Sep. 19, 2016, 11 pages.
ISR for International Application PCT /CN2020/112914 mailed Dec. 3, 2020.
Written Opinion for International Application PCT /CN2020/112914 mailed Dec. 3, 2020.
Chinese Office Action for counterpart application 201910645574.1 mailed Jul. 20, 2021.

\* cited by examiner

POSITIVE ELECTRODE ACTIVE MATERIAL AND PREPARATION METHOD THEREOF, POSITIVE ELECTRODE PLATE, LITHIUM-ION SECONDARY BATTERY, AND APPARATUS CONTAINING SUCH LITHIUM-ION SECONDARY BATTERY

CROSS-REFERENCE TO RELATED APPLICATIONS

This application is a continuation of International Patent Application No. PCT/CN2020/112913 filed on Sep. 1, 2020, which claims priority to Chinese Patent Application No. 201910825311.4 filed on Sep. 2, 2019 and entitled "POSITIVE ELECTRODE ACTIVE MATERIAL AND PREPARATION METHOD THEREOF, POSITIVE ELECTRODE PLATE, AND LITHIUM-ION SECONDARY BATTERY", which is incorporated herein by reference in its entirety.

TECHNICAL FIELD

This application relates to the field of secondary battery technologies, and specifically to a positive electrode active material and a preparation method thereof, a positive electrode plate, a lithium-ion secondary battery, and an apparatus containing such lithium-ion secondary battery.

BACKGROUND

Lithium-ion secondary batteries are rechargeable batteries that operate mainly depending on migration of lithium ions between a positive electrode and a negative electrode, and are a clean energy source currently in wide use. As an important part of a lithium-ion secondary battery, a positive electrode active material provides the lithium ions that reciprocate between the positive and negative electrodes for battery charging and discharging, and therefore the positive electrode active material is crucial to performance of the battery.

As lithium-ion secondary batteries have been increasingly used in various types of apparatuses including consumer electronics and electric vehicles, higher requirements are imposed on energy density and high-temperature cycling performance of the lithium-ion secondary batteries.

SUMMARY

A first aspect of this application provides a positive electrode active material, including bulk particles and a coating layer applied on an exterior surface of each of the bulk particles, where the bulk particle includes a lithium composite oxide that contains element nickel and a doping element $M^1$, and the coating layer includes an oxide of element $M^2$;

when the positive electrode active material is in a 11% delithiated state, an average valence of element $M^1$ is $\alpha^1$, and an average valence of element $M^2$ is $\beta^1$; when the positive electrode active material is in a 78% delithiated state, an average valence of element $M^1$ is $\alpha^2$, and an average valence of element $M^2$ is $\beta^2$; and $\alpha^1$ and $\alpha^2$ satisfy $\alpha^2 > \alpha^1$, and $\beta^1$ and $\beta^2$ satisfy $\beta^1 = \beta^2$; and element $M^1$ includes one or more of Si, Ti, Cr, Mo, V, Se, Nb, Ru, Rh, Pd, Sb, Te, Ce, and W, and element $M^2$ is selected from one or more of Mg, Al, Ca, Zr, Zn, Y, and B.

The positive electrode active material provided in this application includes bulk particles of the lithium composite oxide containing element nickel and the doping element $M^1$, and a coating layer of an oxide of element $M^2$ is applied on an exterior surface of each of the bulk particles. With the delithiation of the positive electrode active material, the average valence of element $M^1$ increases, and the average valence of element $M^2$ is constant. Therefore, capacity extractability of the positive electrode active material is greatly improved, allowing energy density of a lithium-ion secondary battery using the positive electrode active material to be significantly improved. In addition, structural stability of the positive electrode active material during high-temperature cycling and high-temperature storage is greatly improved, and oxidation activity in the electrolyte on the surface of the positive electrode active material is greatly reduced, which can reduce gas generation due to electrolyte decomposition during high-temperature cycling and high-temperature storage of the battery, so that the high-temperature cycling performance and high-temperature storage performance of the battery are also significantly improved.

In any of the foregoing embodiments, optionally; $\alpha^1$ and $\alpha^2$ satisfy $\alpha^2 > \alpha^1 \geq +3$. The battery has better high-temperature cycling performance and high-temperature storage performance.

In any of the foregoing embodiments, optionally, $\alpha^1$ is one or more of valences +3, +4, +5, and +6. Optionally, $\alpha^1$ is one or more of valences +3 and +4. With $\alpha^1$ satisfying the foregoing condition, the high-temperature cycling performance and high-temperature storage performance of the battery can be further improved, and the energy density of the battery may also be further improved.

In any of the foregoing embodiments, element $M^1$ may include one or more of Ti, Mo, V, Nb, Ru, Sb, and W; optionally; element $M^1$ includes one or more of Ti, Nb, Ru, Sb, and W; or element $M^2$ includes one or more of Al, Zr, Zn, Y, and B; optionally, element $M^2$ includes one or more of Al, Zr, Zn, and Y; and optionally, element $M^2$ includes one or more of Al, Zr, and Y. Using a suitable element $M^1$ or element $M^2$ can further improve the high-temperature cycling performance and high-temperature storage performance of the battery, and may also further improve the energy density of the battery.

In any of the foregoing embodiments, optionally, element $M^1$ is uniformly doped into the bulk particle. Uniform doping of element $M^1$ in the bulk particles can further improve the energy density, high-temperature cycling performance and high-temperature storage performance of the battery. A smaller relative deviation of local mass concentration of element $M^1$ in the bulk particle means a more uniform distribution of element $M^1$ in the bulk particle and better overall performance of the battery. Optionally, the relative deviation of local mass concentration of element $M^1$ in the bulk particle is less than 32%, optionally, less than 20%.

In any of the foregoing embodiments, the bulk particle is a secondary particle formed by agglomeration of more than two primary particles. The positive electrode active material therefore has relatively high lithium ion transmission performance, thereby improving the cycling performance of the battery. In particular, when element $M^1$ is uniformly doped into the secondary particle, the lithium ion transmission performance of the positive electrode active material can be further improved, and the structural stability can also be improved, so that the battery has higher cycling performance.

In any of the foregoing embodiments, in the positive electrode active material, a molar ratio of element $M^1$ to element $M^2$ ranges from 0.09:1 to 4:1, optionally from 0.1:1 to 3:1, optionally from 0.2:1 to 2.5:1, and optionally from 0.5:1 to 2:1. An appropriate molar ratio of element $M^1$ to element $M^2$ in the positive electrode active material can further improve the high-temperature cycling performance and high-temperature storage performance of the battery.

In any of the foregoing embodiments, a true doping concentration of element $M^1$ in the positive electrode active material ranges from 2000 μg/cm³ to 55000 μg/cm³, optionally from 2300 μg/cm³ to 49000 μg/cm³, and optionally from 3000 μg/cm³ to 30000 μg/cm³. The positive electrode active material with a true doping concentration of element $M^2$ within the foregoing ranges can well improve the energy density, high-temperature cycling performance and high-temperature storage performance of the battery.

In any of the foregoing embodiments, a concentration of element $M^2$ in the positive electrode active material ranges from 300 ppm to 6500 ppm, optionally from 500 ppm to 5000 ppm. The positive electrode active material with a concentration of element $M^2$ within the foregoing ranges allows the battery to have relatively high high-temperature cycling performance and high-temperature storage performance, and a relatively high energy density.

In any of the foregoing embodiments, a volume-based median particle size $D_v50$ of the positive electrode active material ranges from 8 μm to 20 μm, optionally from 9 μm to 16 μm. The positive electrode active material with a $D_v50$ within an appropriate range can improve the cycling performance and rate performance of the battery, and help enabling the battery to have a relatively high energy density.

In any of the foregoing embodiments, a thickness T of the coating layer ranges from 0.001 μm to 0.5 μm, optionally from 0.1 μm to 0.3 μm. Optionally, the thickness T of the coating layer and an average particle size $\overline{D}$ of the positive electrode active material satisfy: $0.003 \leq T/\overline{D} \leq 0.025$, optionally $0.005 \leq T/\overline{D} \leq 0.02$, and optionally $0.01 \leq T/\overline{D} \leq 0.02$. The coating layer satisfying the foregoing conditions can effectively improve the high-temperature cycling performance and high-temperature storage performance of the battery.

In any of the foregoing embodiments, the lithium composite oxide is a compound represented by a chemical formula 1,

$$Li_{1+a}[Ni_xCO_yMn_zM^1_b]O_{2-p}X_p \qquad \text{chemical formula 1}$$

In chemical formula 1, X is selected from one or more of F N, P, and S, $0.5 \leq x < 1$, $0 \leq y < 0.3$, $0 < z < 0.3$, $-0.2 < a < 0.2$, $0 < b < 0.2$, $0 \leq p < 0.2$, and $x+y+z+b=1$.

The battery using the foregoing high-nickel ternary material can have relatively high energy density, good high-temperature cycling performance, and good high-temperature storage performance.

In any of the foregoing embodiments, when the bulk particles are doped with element X, element X is uniformly doped into the bulk particle. Optionally, a relative deviation of local mass concentration of the doping elements (including element $M^1$ and element X) in the bulk particle is less than 32%, optionally less than 30%, and further optionally less than 20%; or element X shows a mass concentration gradient decreasing from the exterior surface of the bulk particle to the core of the particle; and optionally, element X is doped into the exterior surface layer of the bulk particle.

In any of the foregoing embodiments, the surface of the positive electrode active material is a rough surface. Optionally, the specific surface area of the positive electrode active material ranges from 0.2 m²/g to 1.5 m²/g, and further optionally from 0.3 m²/g to 1 m²/g. The positive electrode active material with a specific surface area within the foregoing ranges can improve capacity extractability and cycling life of the positive electrode active material.

In any of the foregoing embodiments, a true density of the positive electrode active material ranges from 4.6 g/m³ to 5.2 g/m³, optionally from 4.6 g/m³ to 4.9 g/m³. The positive electrode active material with a true density within an appropriate range can improve the energy density of the battery.

In any of the foregoing embodiments, a tap density of the positive electrode active material ranges from 2.3 g/cm³ to 2.8 g/cm³. The positive electrode active material with a tap density within an appropriate range can improve the energy density of the battery.

A second aspect of this application provides a positive electrode plate, including a positive electrode current collector and a positive electrode active substance layer disposed on the positive electrode current collector, where the positive electrode active substance layer includes the positive electrode active material according to the first aspect of this application.

The positive electrode plate in this application includes the positive electrode active material in this application, thereby enabling the lithium-ion secondary battery using the positive electrode plate to have relatively high energy density, high-temperature storage performance and high-temperature cycling performance.

A third aspect of this application provides a lithium-ion secondary battery, including the positive electrode plate according to the second aspect of this application.

The lithium-ion secondary battery in this application includes the positive electrode plate in this application, and therefore can have relatively high energy density high-temperature storage performance and high-temperature cycling performance.

A fourth aspect of this application provides an apparatus, including the lithium-ion secondary battery according to the third aspect of this application.

The apparatus in this application includes the lithium-ion secondary battery in this application, and therefore may have the same or similar beneficial effects.

A fifth aspect of this application provides a preparation method of a positive electrode active material, including:
  providing a mixture including a nickel-containing transition metal source, a lithium source, and a precursor of element $M^1$, and subjecting the mixture to a sintering treatment to obtain bulk particles doped with element $M^1$; and
  mixing the bulk particles and a precursor of element $M^2$, and subjecting a resulting mixture to a sintering treatment to form on an exterior surface of the bulk particle a coating layer that contains an oxide of element $M^2$, so as to obtain the positive electrode active material; where
  when the positive electrode active material is in a 11% delithiated state, an average valence of element $M^1$ is $\alpha^1$, and an average valence of element $M^2$ is $\beta^1$; when the positive electrode active material is in a 78% delithiated state, an average valence of element $M^1$ is $\alpha^2$, and an average valence of element $M^2$ is $\beta^2$; and $\alpha^1$ and $\alpha^2$ satisfy $\alpha^2 > \alpha^1$, and $\beta^1$ and $\beta^2$ satisfy $\beta^1 = \beta^2$; and element $M^1$ includes one or more of Si, Ti, Cr, Mo, V, Se, Nb, Ru, Rh, Pd, Sb, Te, Ce, and W and element $M^2$ is selected from one or more of Mg, Al, Ca, Zr, Zn, Y, and B.

The positive electrode active material obtained by using the preparation method in this application greatly improves its capacity extractability, enabling the energy density of the lithium-ion secondary battery using the positive electrode active material to be significantly improved. In addition, structural stability of the positive electrode active material during high-temperature cycling and high-temperature storage is greatly improved, and oxidation activity in the electrolyte on the surface of the positive electrode active material is greatly reduced, which can reduce gas generation due to electrolyte decomposition during high-temperature cycling and high-temperature storage of the battery, so that the high-temperature cycling performance and high-temperature storage performance of the battery are also significantly improved.

In any of the foregoing embodiments, the mixture may further include a precursor of element X, and the obtained bulk particles are also doped with element X, where element X is selected from one or more of F, N, P, and S; or, before mixing the bulk particles and the precursor of element $M^2$, the preparation method may further include: (c) mixing the bulk particles and the precursor of element X, and subjecting a resulting mixture to a sintering treatment to cause element X to be doped into the bulk particles, where element X is selected from one or more of F, N, P, and S.

In any of the foregoing embodiments, an atmosphere for the sintering treatment in step (a) is an oxygen-containing atmosphere; optionally, a percentage of oxygen in the sintering atmosphere ranges from 70% to 100%, optionally being more than 85%: a temperature for the sintering treatment ranges from 500° C. to 1000° C., optionally from 700° C. to 900° C., and further optionally from 750° C. to 850° C.; and duration for the sintering treatment ranges from 5 hours to 25 hours, optionally from 5 hours to 15 hours.

In any of the foregoing embodiments, an atmosphere for the sintering treatment in step (b) is an oxygen-containing atmosphere; optionally, a percentage of oxygen in the sintering atmosphere ranges from 70% to 100%, optionally more than 85%; a temperature for the sintering treatment ranges from 100° C. to 550° C., optionally from 200° C. to 500° C.; and duration for the sintering treatment ranges from 3 hours to 25 hours, optionally from 5 hours to 10 hours.

In any of the foregoing embodiments, an atmosphere for the sintering treatment in step (c) is an oxygen-containing atmosphere; optionally, a percentage of oxygen in the sintering atmosphere ranges from 70% to 100%, optionally from 80% to 95%; a temperature for the sintering treatment ranges from 400° C. to 1000° C., optionally from 400° C. to 850° C., and optionally from 400° C. to 750° C.; and duration for the sintering treatment ranges from 3 hours to 25 hours, optionally from 5 hours to 10 hours.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

DESCRIPTION OF EMBODIMENTS

To make the objectives, technical solutions, and beneficial technical effects of this application clearer, this application is further described below in detail with reference to embodiments. It should be understood that the embodiments described in this specification are merely intended to interpret this application, but not intended to limit this application.

For simplicity, only some numerical ranges are expressly disclosed in this specification. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, although not expressly recorded, each point or individual value between endpoints of a range is included in the range. Therefore, each point or individual value may be used as its own lower limit or upper limit to be combined with any other point or individual value or combined with any other lower limit or upper limit to form a range not expressly recorded.

In the description of this specification, it should be noted that, unless otherwise stated, "more than" and "less than" a number means inclusion of the number itself, and "more" in "one or more" means at least two.

In the description of this specification, unless otherwise specified, the term "or (or)" is inclusive. In other words, the phrase "A or (or) B" means "A. B, or both A and B". More specifically, all the following conditions fall within the condition "A or B": A is true (or present) and B is false (or not present); A is false (or not present) and B is true (or present); or both A and B are true (or present).

The foregoing invention content of this application is not intended to describe each of the disclosed embodiments or implementations of this application. The following description illustrates exemplary embodiments in more detail by using examples. Throughout this application, guidance is provided by using a series of embodiments and the embodiments may be used in various combinations. In each instance, enumeration is only representative but should not be interpreted as exhaustive.

Positive Electrode Active Material

Figure 1:
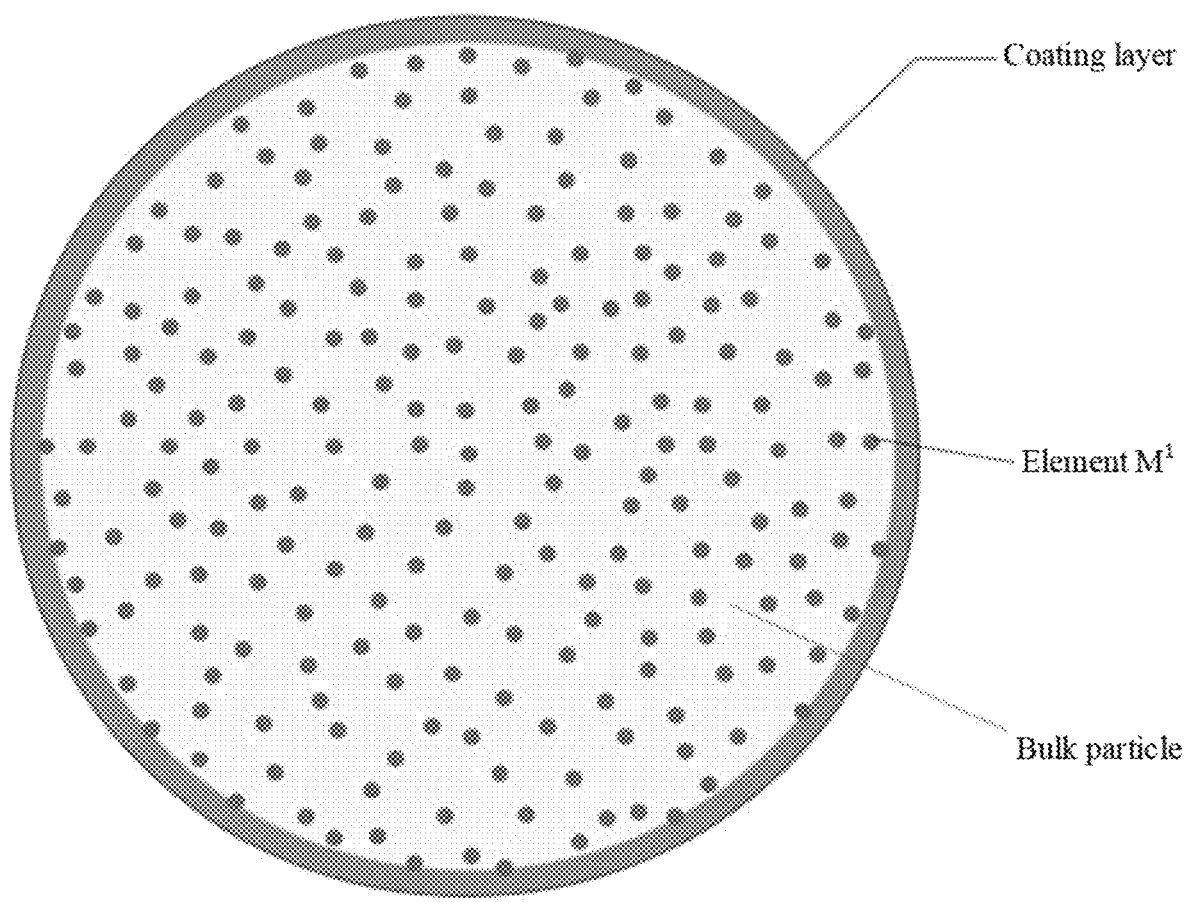
FIG. 1 is a schematic diagram of doping and coating of a positive electrode active material according to an embodiment of this application.

As shown in FIG. 1, this embodiment of this application provides a positive electrode active material, including bulk particles and a coating layer applied on an exterior surface of each of the bulk particles, where the bulk particle includes a lithium composite oxide that contains element nickel and a doping element $M^1$, and the coating layer includes an oxide of element $M^2$.

When the positive electrode active material is in a 11% delithiated state, an average valence of element $M^1$ is $\alpha^1$;

when the positive electrode active material is in a 78% delithiated state, an average valence of element $M^1$ is $\alpha^2$; and $\alpha^1$ and $\alpha^2$ satisfy $\alpha^2 > \alpha^1$.

When the positive electrode active material is in a 11% delithiated state, an average valence of element $M^2$ is $\beta^1$; when the positive electrode active material is in a 78% delithiated state, an average valence of element $M^2$ is $\beta^2$; and $\beta^1$ and $\beta^2$ satisfy $\beta^1 = \beta^2$.

Element $M^1$ includes one or more of Si, Ti, Cr, Mo, V Se, Nb, Ru, Rh, Pd, Sb, Te, Ce, and W, and element $M^2$ is selected from one or more of Mg, Al, Ca, Zr, Zn, Y and B.

In the positive electrode active material provided in this embodiment of this application, the bulk particles use a nickel-based lithium composite oxide, and the bulk particles are doped with element $M^1$. With the delithiation of the positive electrode active material, the average valence of element $M^1$ increases, that is, element $M^1$ can participate in the redox reaction and release electrons in the delithiation process of the positive electrode active material. Therefore, the positive electrode active material can release more lithium ions, showing higher capacity extractability. Using the positive electrode active material allows the energy density of the lithium-ion secondary battery to be significantly improved.

In the positive electrode active material, element $M^1$ itself can effectively bind oxygen atoms. In addition, electrons contributed by element $M^1$ cause charge compensation to take place inside the material, further suppressing oxygen release from the material. In this way, the structural stability of the positive electrode active material during high-temperature cycling and high-temperature storage is greatly improved. In addition, a coating layer of an oxide of element $M^2$ is applied on an exterior surface of each of the bulk particles, and with the delithiation of the positive electrode active material, the average valence of element $M^2$ is constant. The coating layer provides a continuous and stable strong protection for the bulk particle, effectively blocks the electrolyte from corroding the bulk particles, and further improves the structural stability of the positive electrode active material. Therefore, using the positive electrode active material can further significantly improve the high-temperature cycling performance and high-temperature storage performance of the battery.

The charge compensation effect in the positive electrode active material from element $M^1$ can also reduce an amount of $Ni^{4+}$ with strong oxidizability in the material, and reduce the surface oxygen defects of the material, thereby effectively reducing oxidation activity in the electrolyte on the surface of the material, and greatly reducing gas generation due to electrolyte decomposition during high-temperature cycling and high-temperature storage of the battery. Moreover, the protective effect of the coating layer on the bulk particle can further reduce gas generation due to electrolyte decomposition on the surface of the material. Therefore, high-temperature cycling performance and high-temperature storage performance of the battery can be further improved.

In this specification, the "78% delithiated state" means a state in which the number of moles of lithium released from the positive electrode active material accounts for 78% of the theoretical total number of moles of lithium during charging of the battery. Similarly, the "11% delithiated state" is a state in which the number of moles of lithium released from the positive electrode active material accounts for 11% of the theoretical total number of moles of lithium during charging of the battery. In actual use of lithium-ion secondary batteries, a "fully discharged state" and a "fully charged state" are typically set, and a "discharge cut-off voltage" and a "charge cut-off voltage" of the battery are set correspondingly to ensure safe use of the battery. The "discharge cut-off voltage" and "charge cut-off voltage" may vary with different positive electrode active materials or safety requirements. For secondary batteries prepared by using a positive electrode active material with a nickel-containing lithium composite oxide, a delithiated state of the positive electrode active material in a "fully discharged state" generally corresponds to the "11% delithiated state", and a delithiated state of the positive electrode active material in a "fully charged state" generally corresponds to the "78% delithiated state". When a battery is used in charge and discharge, a corresponding positive electrode active material works between the 11% delithiated state and 78% delithiated state to ensure normal use.

In this specification, with reference to a correspondence between a "delithiated state" and a "voltage", a positive electrode active material in the "11% delithiated state" and a positive electrode active material in the "78% delithiated state" are obtained for research. Specifically, a series of standard half button batteries prepared by using the positive electrode active material are separately charged to 2.8 V, 2.9 V, 3.0 V, 3.1 V 3.2 V, 3.3 V, . . . , 4.0 V, 4.1 V, 4.2 V, 4.3 V, 4.4 V, and 4.5 V (that is, a charging voltage step is 0.1 V) at a rate of 0.1C. Then the positive electrode plates of the batteries are removed, electrolytes are washed away from the positive electrode plates, and the positive electrode active material is digested. Mass concentrations of element Li in the positive electrode active materials are tested by using an inductively coupled plasma-optical emission spectrometer (ICP-OES). "delithiated states" are calculated, a correspondence between a charging voltage and a "delithiated state" is obtained, and then a charging voltage corresponding to the "11% delithiated state" and a charging voltage corresponding to "78% delithiated state" are obtained.

Then, half cells containing the positive electrode active material are charged to a voltage $U_1$ corresponding to the "11% delithiated state", and the positive electrode active material in the "11% delithiated state" can be obtained through disassembly of the half cells. Similarly, half cells containing the positive electrode active material are charged to a voltage $U_2$ corresponding to the "78% delithiated state", and the positive electrode active material in the "78% delithiated state" can be obtained through disassembly of the half cells.

Valences of element $M^1$ and element $M^2$ in the positive electrode active material in the "11% delithiated state" and in the positive electrode active material in the "78% delithiated state" may be obtained through X-ray photoelectron spectroscopy (XPS) analysis tests. More precisely, the valences may be determined through synchrotron radiation photoelectron spectroscopy (SRPES) analysis tests.

In some optional embodiments, an average valence $\alpha^1$ of element $M^1$ in the positive electrode active material in the "11% delithiated state" and an average valence $\alpha^2$ of element $M^1$ in the positive electrode active material in the "78% delithiated state" satisfy $\alpha^2 > \alpha^1 \geq +3$. During charging and discharging, the average valence of element $M^1$ in the positive electrode active material remains more than +3. Element $M^1$ in a high valence state strengthens the binding of oxygen atoms in the material, can further improve the structural stability of the positive electrode active material, and prevent the positive electrode active material from lattice cracking during high-temperature cycling and high-temperature storage. Therefore, the battery can have better high-temperature cycling performance and high-temperature storage performance.

Element $M^1$ in a high valence state can contribute more electrons in the positive electrode active material, which further reduce oxidation activity in the electrolyte on the surface of the material, enabling the high-temperature cycling performance and high-temperature storage performance of the battery to be further improved.

More electrons contributed by element $M^1$ in a high valence state can cause the positive electrode active material to release more lithium ions, thereby further increasing the energy density of the battery.

Optionally, $\alpha^1$ is one or more of valences +3, +4, +5, and +6. Optionally, $\alpha^1$ is one or more of valences +3 and +4.

In some embodiments, element $M^1$ may include one or more of Ti, Mo, V. Nb, Ru, Sb, and W Optionally, element $M^1$ may include one or more of Ti, Nb, Ru, Sb, and W.

In some embodiments, element $M^2$ may include one or more of Al, Zr, Zn, Y, and B. Optionally, element $M^2$ may include one or more of Al, Zr, Zn, and Y. Optionally, element $M^2$ may include one or more of Al, Zr, and Y.

In some optional embodiments, optionally, element $M^1$ is uniformly doped into the bulk particle. The uniform doping of element $M^1$ allows consistent properties of internal portions of the bulk particle, so that structural stability of all locations in the bulk particle is improved, and a problem of oxygen release from all locations in the bulk particles is alleviated, thereby further improving the structural stability of the positive electrode active material during high-temperature storage and high-temperature cycling, and better improving the battery performance.

The uniform doping of element $M^1$ in the bulk particles also makes migration and diffusion capabilities of lithium ions at different zones of the bulk particle at a same level, and the structural stability and deformation resistance at all sites of the bulk particle close to each other, so that stress distribution inside the particles of the positive electrode active material is uniform, and the particles are not prone to crack, preventing side reactions and performance degradation caused by exposed fresh surfaces due to crack, and thereby further improving the energy density, high-temperature cycling performance, and high-temperature storage performance of the battery.

In some embodiments, a relative deviation of local mass concentration of element $M^1$ in the bulk particle is less than 32%, further less than 30%, for example, less than 20%, less than 15%, less than 12%, less than 11%, or less than 10%. A smaller relative deviation of local mass concentration of element $M^1$ in the bulk particle means a more uniform distribution of element $M^1$ in the bulk particle and better overall performance of the battery.

In this specification, the local mass concentration of element $M^1$ in the bulk particle is a mass concentration of element $M^1$ in all elements in a finite volume element at any selected site in the bulk particle, and may be obtained by testing the element concentration distribution through EDX (Energy Dispersive X-Ray Spectroscopy) or EDS element analysis in combination with TEM (Transmission Electron Microscopee) or SEM (Scanning Electron Microscope) single-point scanning, or using other similar methods. When the test is performed through EDX or EDS element analysis in combination with TEM or SEM single-point scanning, the mass concentration of element $M^1$ in µg/g at different sites in the bulk particles are respectively denoted as $\eta_1$, $\eta_2$, $\eta_3$, ..., $\eta_n$, where n is a positive integer greater than or equal to 15.

An average mass concentration of element $M^1$ in the bulk particles is a mass concentration of element $M^1$ in all elements within a single bulk particle, and may be obtained by testing element concentration distribution through EDX or EDS element analysis in combination with TEM or SEM plane scanning, or using other similar methods. When the test is performed in the manner of testing element concentration distribution through EDX or EDS element analysis in combination with TEM or SEM plane scanning, the testing plane includes all points in the foregoing single-point testing. The average mass concentration of element $M^1$ in the bulk particles is denoted as $\bar{\eta}$ in µg/g.

The relative deviation a of local mass concentration of element $M^1$ in the bulk particles is calculated according to the following equation (1):

$$\sigma = \frac{\max\{|\eta_1 - \bar{\eta}|, |\eta_1 - \bar{\eta}|, |\eta_3 - \bar{\eta}|, \ldots, |-^-|\}}{\bar{\eta}} \quad \text{equation (1)}$$

In some embodiments, the bulk particle is a secondary particle formed by agglomeration of more than two primary particles. The positive electrode active material therefore has relatively high lithium ion transmission performance, thereby improving the cycling performance of the battery. In particular, when element $M^1$ is uniformly doped into the secondary particle, the lithium ion transmission performance of the positive electrode active material can be further improved, and the structural stability can also be improved, so that the battery has higher cycling performance.

In some embodiments, a molar ratio of element $M^1$ to element $M^2$ in the positive electrode active material may range from 0.09:1 to 4:1, may also range from 0.1:1 to 3:1, further from 0.2:1 to 2.5:1, and furthermore from 0.5:1 to 2:1.

An appropriate molar ratio of element $M^1$ to element $M^2$ in the positive electrode active material can help better exert a synergistic effect of modification through doping with element $M^1$ and modification through a coating containing an oxide of element $M^2$. Under such synergistic effect, irreversible structural phase transition of the positive electrode active material can be effectively inhibited, the surface of the positive electrode active material is effectively protected against corrosion by the electrolyte, and an amount of gas produced by the battery is reduced, thereby further improving the high-temperature cycling performance and high-temperature storage performance of the battery.

The foregoing molar ratio of element $M^1$ to element $M^2$ in the positive electrode active material further helps improve the ionic conductivity of the positive electrode active material, thereby improving the energy density of the battery.

In some embodiments, a true doping concentration ω of element $M^1$ in the positive electrode active material may range from 2000 µg/cm³ to 55000 µg/cm³, may further range from 2300 µg/cm³ to 49000 µg/cm³, and may further range from 3000 µg/cm³ to 30000 µg/cm³, from 11028 µg/cm³ to 30000 µg/cm³, or from 11028 µg/cm³ to 25351 µg/cm³.

The true doping concentration D of element $M^1$ in the positive electrode active material is more than 2000 µg/cm³, for example more than 2300 µg/cm³ or more than 3000 µg/cm³, which can effectively improve gram capacity and structural stability of the positive electrode active material, and reduce oxidation activity in the electrolyte on the surface of the material. The true doping concentration m of element $M^1$ in the positive electrode active material is less than 55000 μg/cm³, for example less than 49000 μg/cm³ or less than 30000 μg/cm³, which allows the positive electrode active material to have a good layered crystal structure, prevents element $M^1$ from entering a lithium layer, and ensures that the positive electrode active material provides a good carrier for deintercalation of lithium ions, which is beneficial to intercalation and deintercalation of lithium ions, and effectively inhibits irreversible consumption of active lithium ions, allowing the positive electrode active material to have relatively high initial capacity and cycling capacity retention rate.

Therefore, the positive electrode active material with a true doping concentration of element $M^1$ within the foregoing ranges can well improve the energy density, high-temperature cycling performance and high-temperature storage performance of the battery.

In this specification, the true doping concentration ω of element $M^1$ in the positive electrode active material is calculated according to the equation (2):

$$\omega = \varphi \times \rho_{true} \qquad \text{equation (2)}$$

In the equation (2), ω is the true doping concentration of element $M^1$ in the positive electrode active material in μg/cm³.

$\Sigma_{true}$ is a true density of the positive electrode active material in g/cm³, and is equal to a ratio of mass of the positive electrode active material to a true volume of the positive electrode active material, where the true volume is a true volume of a solid substance, and does not include pores inside or between particles of the positive electrode active material. $\rho_{true}$ may be measured by using an instrument and a method that are well known in the art, for example, a gas volume method that may be performed by using a powder true density tester.

φ is a mass concentration of element $M^1$ in the positive electrode active material in μg/g, that is, the mass of element $M^1$ contained per gram of the positive electrode active material. φ represents the concentration of element $M^1$ in overall macroscopic positive electrode active material, including element $M^1$ doped into the bulk particles of the positive electrode active material, element $M^1$ enriched in other phases on surfaces of the bulk particles of the positive electrode active material, and element $M^1$ embedded in the particles of the positive electrode active material. φ may be obtained through an absorption spectrum test of the positive electrode active material solution, for example ICP (Inductive Coupled Plasma Emission Spectrometer) test, XAFS (X-ray absorption fine structure spectroscopy, X-ray absorption fine structure spectroscopy) test, or another test.

In some embodiments, the concentration of element $M^2$ in the positive electrode active material may range from 300 ppm to 6500 ppm. The concentration of element $M^2$ in the positive electrode active material may be ≥300 ppm, ≥500 ppm, ≥1000 ppm, ≥1500 ppm, ≥2000 ppm, or ≥2500 ppm; and may be ≤3000 ppm, ≤3500 ppm, ≤4000 ppm, ≤4500 ppm, ≤5000 ppm, or ≤6500 ppm. Optionally, the concentration of element $M^2$ in the positive electrode active material ranges from 500 ppm to 5000 ppm. ppm (parts per million) is a ratio of mass of element $M^2$ in the positive electrode active material to mass of the positive electrode active material in parts per million.

The positive electrode active material with a concentration of element $M^2$ within the foregoing ranges can help the coating layer to be bonded with the bulk particle more firmly, and prevent the coating layer from falling off during high-temperature cycling and high-temperature storage of the battery, thereby effectively exert the protective effect of the coating layer on the bulk particle to make the battery have relatively high high-temperature cycling performance and high-temperature storage performance. In addition, the positive electrode active material also maintains relatively high lithium ion diffusion and migration capabilities, enabling the battery to have relatively high energy density.

The concentration of element $M^2$ in the positive electrode active material may be obtained through an absorption spectrum test of the positive electrode active material solution, for example ICP (Inductive Coupled Plasma Emission Spectrometer) test, XAFS (X-ray absorption fine structure spectroscopy) test, or another test.

In some embodiments, a thickness T of the coating layer optionally ranges from 0.001 μm to 0.5 μm, for example, from 0.01 μm to 0.4 μm, and for another example, from 0.1 μm to 0.3 μm, from 0.21 μm to 0.3 μm, or from 0.210 sin to 0.267 μm. The coating layer with a thickness within the foregoing ranges is not prone to falling off from the bulk particle in repeated processes of delithiation and lithiation of the positive electrode active material, thereby continuously protecting the bulk particle, and ensuring that the positive electrode active material has relatively high lithium ion migration and diffusion capabilities and gram capacity.

In some optional embodiments, the thickness T of the coating layer and an average particle size $\overline{D}$ of the positive electrode active material satisfy: $0.003 \leq T/\overline{D} \leq 0.025$, Optionally, $0.005 \leq T/\overline{D} \leq 0.02$, for example $0.01 \leq T/\overline{D} \leq 0.02$, which allows more effective protection of the coating layer on the bulk particle, and ensures that the positive electrode active material has relatively high lithium ion diffusion and migration capabilities and gram capacity.

The thickness of the coating layer may be determined by using a method well known in the art. In an example, a cross-section polisher (for example, an IB-09010CP argon ion cross-section polisher from the electronic company JEOL in Japan) may be used for preparing a cross section of a particle of the positive electrode active material. The cross section passes through the core of the particle of the positive electrode active material. Then an image for element distribution in the cross-section is obtained through EDX or EDS element analysis in combination with TEM or SEM (for example, an X-Max EDS from Oxford Instruments Group in UK in combination with a Sigma-02-33 SEM from ZEISS in German) plane scanning; and the thickness of the coating layer is obtained based on the distribution of elements in the cross section. More precisely, thickness values of the coating layer at multiple (more than 3, for example, 5, 8, 10, or 12) different locations on the cross-section may be measured, and an average thereof is recorded as the thickness of the coating layer.

The average particle size $\overline{D}$ of the positive electrode active material is an average value of diameters of the positive electrode active material particle in multiple orientations. For example, an image for element distribution in the cross section of the positive electrode active material may be obtained through EDX or EDS element analysis in combination with TEM or SEM plane scanning, multiple (more than 3, for example, 5, 8, 10, or 12) diameters in different orientations may be obtained based on the element distribution in the cross section, and an average thereof is recorded as the average particle size $\overline{D}$ of the positive electrode active material.

In some embodiments, a volume-based median particle size $D_v50$ of the positive electrode active material optionally ranges from 8 μm to 20 μm, for example from 9 μm to 18 μm, and for another example, from 9 μm to 16 μm. The positive electrode active material with a $D_v50$ within the foregoing ranges can improve transmission and diffusion performance of lithium ions and electrons in the particles of the positive electrode active material, and is beneficial to reduce side reactions of the electrolyte on the surface of the particle and inhibit particle agglomeration, thereby improving the cycling performance and rate performance of the battery. In addition, the positive electrode active material with a $D_v50$ within the foregoing ranges also allows the positive electrode active material to have a relatively high compacted density, and increase the energy density of the battery.

In some embodiments, the surface of the positive electrode active material is a rough surface, which is beneficial to increase the specific surface area of the positive electrode active material and improve capacity extractability of the positive electrode active material.

In some embodiments, the specific surface area of the positive electrode active material may range from 0.2 m²/g to 1.7 m²/g, and further may range from 0.2 m²/g to 1.5 m²/g, for example from 0.3 m²/g to 1 m²/g. The specific surface area of the positive electrode active material within the foregoing ranges ensures that the positive electrode active material has a relatively high active specific surface area, and is beneficial to reduce side reactions of the electrolyte on surface of the positive electrode active material, thereby improving capacity extractability and cycle life of the positive electrode active material.

In some embodiments, a tap density of the positive electrode active material optionally ranges from 2.3 g/cm³ to 2.8 g/cm³, which is beneficial to make the battery have a relatively high energy density.

In some embodiments, the true density of the positive electrode active material may range from 4.6 g/m³ to 5.2 g/m³, and further may range from 4.6 g/m³ to 4.9 g/m³. The positive electrode active material with a true density within an appropriate range allows the positive electrode active material to have relatively high specific capacity and energy density, thereby improving the capacity performance and energy density of the battery.

In some embodiments, in the lithium composite oxide, the number of moles of nickel is 50% to 95% of the total number of moles of transition-metal-site elements, for example, 50%, 60%, 65%, 70%, 75%, 80%, 85%, 90%, or 95%. The positive electrode active material has a relatively high specific capacity and can further improve the energy density of the battery.

The lithium composite oxide has a layered structure with lithium sites, transition metal sites, and oxygen sites. Element $M^1$ is doped into the transition metal sites. The transition-metal-site elements are elements at transition metal sites.

In some embodiments, the lithium composite oxide is a compound represented by a chemical formula 1:

    chemical formula 1

In chemical formula 1, $M^1$ is a doping substitute for one or more of a nickel site, a cobalt site, and a manganese site in the bulk particle; X is a substituent for oxygen sites of the bulk particle and X may be selected from one or more of F, N, P, and S, $0.5 \le x < 1$, $0 \le y < 0.3$, $0 \le z < 0.3$, $-0.2 < a < 0.2$, $0 < b < 0.2$, $0 \le p < 0.2$, and $x+y+z+b=1$. The battery using the high-nickel ternary material can have relatively high energy density, high-temperature cycling performance, and high-temperature storage performance.

Optionally, $0.6 \le x \le 0.9$, for example, $0.7 \le x \le 0.8$.

Optionally, X may be selected from one or more of F, N, and S. Optionally, X includes F.

In some embodiments, when the bulk particles are doped with element X, element X may be uniformly doped into the bulk particle. For example, a relative deviation of local mass concentration of the doping elements (including element $M^1$ and element X) in the bulk particle may be less than 32%, for example less than 30%, and for another example less than 20%. The uniformly doped positive electrode active material has better overall structural stability.

Element X may also show a mass concentration gradient decreasing from the exterior surface of the bulk particle to the core of the particle. For example, element X is doped into the exterior surface layer of the bulk particle, which can reduce the surface oxygen activity of the material, allowing the material to have relatively high kinetic performance and gram capacity.

The volume-based median particle size $D_v50$ of the positive electrode active material has a well-known definition in the art, and is also referred to as a medium particle size, meaning a particle size corresponding to 50% volume distribution of the positive electrode active material particle. The volume-based median particle size $D_v50$ of the positive electrode active material may be determined by using an instrument and a method that are well known in the art, for example, may be easily determined by using a laser particle size analyzer, for example, a Mastersizer 3000 laser particle size analyzer from Malvern Instruments Ltd. in UK.

The specific surface area of the positive electrode active material has the meaning well known in the art, and may be determined by using instruments and methods that are well known in the art, for example, may be determined by using the nitrogen adsorption specific surface area analysis test method and calculated by using the BET (Brunauer Emmett Teller) method. The nitrogen adsorption specific surface area analysis test may be carried out by using the NOVA 2000e specific surface area and pore size analyzer from Quantachrome company in USA. In a specific example, the test method is as follows: Approximately 8.000 g to 15.000 g of the positive electrode active material is placed into a weighed empty sample tube, the positive electrode active material is stirred well and weighed, the sample tube is put into the NOVA 2000e degassing station for degassing, total mass of the degassed positive electrode active material and the sample tube is weighed, and mass G of the degassed positive electrode active material is calculated by subtracting the mass of the empty sample tube from the total mass. The sample tube is put into the NOVA 2000e, adsorption amounts of nitrogen on the surface of the positive electrode active material at different relative pressures are determined, an adsorption amount of a monomolecular layer is calculated according to the Brunauer-Emmett-Teller multilayer adsorption theory and its equation, then a total surface area A of the positive electrode active material is calculated, and the specific surface area of the positive electrode active material is calculated by A/G.

The tap density of the positive electrode active material has a well-known definition in the art, and may be determined by using an instrument and a method that are well known in the art, for example, may be easily determined by using a tap density meter, for example, an FZS4-4B type tap density meter.

Next, a preparation method for a positive electrode active material is exemplarily illustrated. According to this preparation method, any of the foregoing positive electrode active materials can be prepared. The preparation method includes a preparation step S10 for bulk particles and a preparation step S20 for a coating layer.

S10. Provide a mixture including a nickel-containing transition metal source, a lithium source, and a precursor of element $M^1$, and subject the mixture to a sintering treatment to obtain bulk particles doped with element $M^1$.

The nickel-containing transition metal source for example is one or more of an oxide, a hydroxide, or a carbonate containing Ni, for example, a hydroxide containing Ni, Co. and Mn.

A hydroxide containing Ni, Co, and Mn may be obtained through a method known in the art, for example prepared through a co-precipitation method, a gel method or a solid phase method.

In an example, a mixed solution is obtained by dispersing a Ni source, a Co source, and an Mn source into a solvent; with continuous co-current reactions, the mixed solution, a strong base solution, and a complexing agent solution are all pumped into a stirring reactor at the same time, where a pH value of the reaction solution is controlled to be 10 to 13, a temperature in the reactor is controlled to be 25° C. to 90° C., and inert gas is introduced for protection during the reaction; and after the reaction is completed, aging, filtration, washing, and vacuum drying are carried out, the hydroxide containing Ni, Co, and Mn is obtained.

The Ni source may be a soluble nickel salt, for example, one or more of nickel sulfate, nickel nitrate, nickel chloride, nickel oxalate, and nickel acetate, for another example, one or more of nickel sulfate and nickel nitrate, and for another example, nickel sulfate. The Co source may be a soluble cobalt salt, for example, one or more of cobalt sulfate, cobalt nitrate, cobalt chloride, cobalt oxalate and cobalt acetate, for another example, one or more of cobalt sulfate and nitric acid, and for another example, cobalt sulfate. The Mn source may be a soluble manganese salt, for example, one or more of manganese sulfate, manganese nitrate, manganese chloride, manganese oxalate and manganese acetate, for another example, one or more of manganese sulfate and manganese nitrate, and for another example, manganese sulfate.

The strong alkali may be one or more of LiOH, NaOH, and KOH, for example, NaOH. The complexing agent may be one or more of ammonia, ammonium sulfate, ammonium nitrate, ammonium chloride, ammonium citrate, and disodium ethylenediaminetetraacetic acid (EDTA), for example, ammonia.

The solvents of the mixed solution, strong alkali solution, and complexing agent solution are not particularly limited. For example, the solvents of the mixed solution, strong alkali solution, and complexing agent solution each are one or more of deionized water, methanol, ethanol, acetone, isopropanol, and n-hexanol, for example, deionized water.

The inert gas introduced during the reaction is, for example, one or more of nitrogen, argon, and helium.

The lithium source may be one or more of lithium oxide ($Li_2O$), lithium phosphate ($Li_3PO_4$), lithium dihydrogen phosphate ($LiH_2PO_4$), lithium acetate ($CH_3COOLi$), lithium hydroxide (LiOH), lithium carbonate ($Li_2CO_3$), and lithium nitrate ($LiNO_3$). Further, the lithium source is one or more of the lithium carbonate, the lithium hydroxide, and the lithium nitrate; or further, the lithium source is the lithium carbonate.

The precursor of element $M^1$ may be one or more of an oxide, a nitrate, a carbonate, a bicarbonate, a sulfate, a chloride, a hydroxide and an acetate of element $M^1$, which can be selected based on an actual need. For example, the precursor of element $M^1$ is an oxide of element $M^1$, for example, one or more of silicon oxides (such as $SiO_2$ and SiO), titanium oxides (such as $TiO_2$ and TiO), chromium oxides (such as $CrO_3$ and $Cr_2O_3$), molybdenum oxides (such as $MoO_2$ and $MoO_3$), vanadium oxides (such as $V_2O_5$, $V_2O_4$, and $V_2O_3$), selenium oxides (such as $SeO_2$), niobium oxides (such as $Nb_2O_5$ and $NbO_2$), ruthenium oxides (such as $RuO_2$), palladium oxides (such as PdO), rhodium oxides (such as $Rh_2O_3$), antimony oxides (such as $Sb_2O_5$ and $Sb_2O_3$), tellurium oxides (such as $TeO_2$), cerium oxides (such as $CeO_2$), and tungsten oxides (such as $WO_2$ and $WO_3$).

In step S10, a ball mill mixer or a high-speed mixer may be used to mix the materials. For example, the nickel-containing transition metal source, the lithium source, and the precursor of element $M^1$ are added into a high-speed mixer for mixing for 0.5 hours to 3 hours.

In step S10, the mixed materials may be added to an atmosphere sintering furnace for sintering. The sintering atmosphere is an atmosphere containing oxygen, for example, an air or oxygen atmosphere. An $O_2$ concentration in the sintering atmosphere for example ranges from 70% to 100%, further being more than 80%, and furthermore, more than 85%. A sintering temperature ranges for example from 500° C. to 1000° C., for another example from 600° C. to 1000° C., and for another example from 700° C. to 900° C., for example, from 750° C. to 850° C. This is beneficial to cause element $M^1$ to be uniformly doped into the bulk particles, in particular, allowing element $M^1$ to have relatively high doping uniformity in the bulk particles. Sintering duration may be adjusted based on an actual situation, for example, from 5 hours to 25 hours, and for another example, from 5 hours to 15 hours.

It should be noted that in the preparation of the positive electrode active material, many theoretically feasible ways may be used to adjust and control the distribution and the valence state in different delithiated states of element $M^1$ in the lithium nickel composite oxide, for example, a valence state of the precursor itself of element $M^1$, the proportions of used precursors of different element $M^1$ valence states, the oxidation of the sintering atmosphere during doping, the number of sintering times, the uniformity of mixing, the sintering temperature, and the sintering duration. In this application file, methods of controlling the type of doping precursor, sintering duration and temperature in step S10 are listed to obtain a series of positive electrode active materials. The positive electrode active material is characterized by high energy density, thermal stability, and high-temperature cycling stability. Optionally, the positive electrode active material subjected to the doping homogeneity of element $M^1$ being further controlled and having the valence characteristics of element $M^1$ in different delithiated states has a better effect.

In some embodiments, after the sintering treatment in step S10, a sintered product may alternatively be crushed and sieved, to obtain a positive electrode active material with optimized particle size distribution and specific surface area. The crushing method is not particularly limited, and may be selected based on an actual need, for example, using a particle crusher.

S20. Mix the bulk particles and a precursor of element $M^2$, and subject a resulting mixture to a sintering treatment to form on an exterior surface of the bulk particle a coating layer that contains an oxide of element $M^2$, so as to obtain the positive electrode active material.

The precursor of element $M^2$ may be one or more of a chloride, a sulfate, a nitrate, an oxide, a hydroxide, a fluoride, a carbonate, a bicarbonate, an acetate, a phosphate, a dihydrogen phosphate, and an organic compound of element $M^2$, but is not limited thereto.

In step S20, a ball mill mixer or a high-speed mixer may be used to mix the materials. For example, the bulk particle and the precursor of element $M^2$ are added to a high-speed mixer for mixing for 0.5 hours to 3 hours.

In step S20, the mixed materials may be added to an atmosphere sintering furnace for sintering. The sintering atmosphere is an atmosphere containing oxygen, for example, an air or oxygen atmosphere. An $O_2$ concentration in the sintering atmosphere for example ranges from 70% to 100%, further being more than 80%, and furthermore, more than 85%. A sintering temperature ranges for example from 100° C. to 550° C., and for another example, from 200° C. to 500° C., from 240° C. to 310° C., or from 260° C. to 310° C. Sintering duration may range from 3 hours to 25 hours, for example from 5 hours to 10 hours. Due to the lower sintering temperature, oxides of element $M^2$ are hardly diffused into the interior of the bulk particles, but form a coating layer applied on the exterior surface of the bulk particle. Element $M^2$ matches the surface lattice of the bulk particle, so that the coating layer and the bulk particle are closely bonded, and the coating layer does not damage the structure of the bulk particle, so that the coating layer can reliably protect the bulk particle.

In some optional embodiments, in step S10, the mixture also includes a precursor of element X, the obtained bulk particles are also doped with element X, and element X is selected from one or more of F, N, P, and S.

The precursor of element X for example may be selected from one or more of ammonium fluoride, lithium fluoride, hydrogen fluoride, elemental phosphorus, phosphorus oxide, ammonium dihydrogen phosphate, ammonium metaphosphate, ammonium dihydrogen phosphite, ammonium nitrate, ammonium nitrite, ammonium carbonate, ammonium bicarbonate, ammonium sulfate, ammonium bisulfate, ammonium bisulfite, ammonium sulfite, ammonium hydrosulfide, hydrogen sulfide, lithium sulfide, ammonium sulfide, and elemental sulfur, but is not limited thereto.

In some other optional embodiments, before step S20, the preparation method may further include a step S30: mixing the bulk particles and the precursor of element X, and subjecting a resulting mixture to a sintering treatment, so that element X is doped into the bulk particles.

In step S30, the precursor of element X mentioned above may be used.

In step S30, a ball mill mixer or a high-speed mixer may be used to mix the materials. For example, the bulk particle and the precursor of element X are added to a high-speed mixer for mixing, and a mixing duration may range from 0.5 hours to 3 hours.

In step S30, the mixed materials may be added to an atmosphere sintering furnace for sintering. The sintering atmosphere is an atmosphere containing oxygen, for example, an air or oxygen atmosphere. An $O_2$ concentration in the sintering atmosphere for example ranges from 70% to 100%, and further from 80% to 95%. The sintering temperature for example ranges from 400° C. to 1000° C., for example from 400° C. to 850° C., and for another example from 400° C. to 750° C. Sintering duration may range from 3 hours to 25 hours, for example from 5 hours to 10 hours.

By adjusting and controlling the sintering temperature and the sintering duration, element X can be uniformly doped into the bulk particles, or element X shows a mass concentration gradient decreasing from the exterior surface of the bulk particle to the core of the particle.

Positive Electrode Plate

This application further provides a positive electrode plate, where the positive electrode plate includes any one or more of the foregoing positive electrode active materials.

The positive electrode plate according to an embodiment of this application uses the positive electrode active material according to an embodiment of this application, and therefore also has the foregoing beneficial effects. The lithium-ion secondary battery using the positive electrode plate in this application can have good high-temperature cycling performance and high-temperature storage performance and a relatively high energy density.

In an example, the positive electrode plate includes a positive electrode current collector and a positive electrode active substance layer disposed on at least one surface of the positive electrode current collector. For example, the positive electrode current collector includes two opposite surfaces in thickness direction of the positive electrode current collector, and the positive electrode active substance layer is provided on either or both of the two surfaces of the positive electrode current collector.

The positive electrode active substance layer includes any one or more of the foregoing positive electrode active materials in this application.

The positive electrode active substance layer may further include a conductive agent and a binder. Types of the conductive agent and the binder in the positive electrode active substance layer are not specifically limited in this application, and may be selected based on an actual need.

In an example, the conductive agent may be one or more of graphite, superconducting carbon, acetylene black, carbon black. Ketjen black, carbon dots, carbon nanotube, graphene, and carbon nanofiber; and the binder may be one or more of styrene-butadiene rubber (SBR), water-based acrylic resin (water-based acrylic resin), sodium carboxymethyl cellulose (CMC-Na), polyvinylidene fluoride (PVDF), polytetrafluoroethylene (PTFE), polyvinyl butyral (PVB), ethylene vinyl acetate copolymer (EVA), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, fluorine-containing acrylic resin, and polyvinyl alcohol (PVA).

The positive electrode current collector may use a metal foil material or a porous metal plate with good electrical conductivity and mechanical properties, for example, aluminum foil.

The positive electrode plate may be prepared by using a conventional method in the art. For example, the positive electrode active material, the conductive agent, and the binder are dispersed in a solvent which may be N-methylpyrrolidone (NMP), to obtain a uniform positive electrode slurry. The positive electrode slurry is applied on the positive electrode current collector and after processes such as drying and rolling are performed, the positive electrode plate is obtained.

Lithium-Ion Secondary Battery

An embodiment of this application further provides a lithium-ion secondary battery, where the lithium-ion secondary battery includes a positive electrode plate, a negative electrode plate, a separator, and an electrolyte, and the positive electrode plate is the foregoing positive electrode plate.

The lithium-ion secondary battery uses the positive electrode plate in this embodiment of this application, and therefore can have good room-temperature and high-temperature cycling performance, relatively high high-temperature storage performance, and a relatively high energy density.

The negative electrode plate may be a lithium-metal sheet.

Alternatively, the negative electrode plate may include a negative electrode current collector and a negative electrode active substance layer disposed on at least one surface of the negative electrode current collector. For example, the negative electrode current collector includes two opposite surfaces in thickness direction of the negative electrode current collector, and the negative electrode active substance layer is provided on either or both of the two surfaces of the negative electrode current collector.

The negative electrode active substance layer includes a negative electrode active material. Types of the negative electrode active material is not specifically limited in this application, and may be selected based on an actual requirement. In an example, the negative electrode active material may be one or more of natural graphite, artificial graphite, mesocarbon microbeads (MCMB), hard carbon, soft carbon, silicon, a silicon-carbon composite, $SiO_m$ (0<m<2, for example, m=1), a Li—Sn alloy, a Li—Sn—O alloy, Sn, SnO, $SnO_2$, lithium titanate $Li_4Ti_5O_{12}$ with a spinel-structure, an Li—Al alloy, and a lithium metal.

The negative electrode active substance layer may further include a conductive agent and a binder. Types of the conductive agent and binder in the negative electrode active substance layer are not specifically limited in the embodiments of this application, and may be selected based on an actual need. In an example, the conductive agent is one or more of graphite, superconducting carbon, acetylene black, carbon black, Ketjen black, carbon dots, carbon nanotubes, graphene, and carbon nanofibers. The binder is one or more of styrene-butadiene rubber (SBR), polyvinylidene fluoride (PVDF), polytetrafluoroethylene (PTFE), polyvinyl butyral (PVB), and water-based acrylic resin.

The negative electrode active substance layer further optionally includes a thickener, for example, sodium carboxymethyl cellulose (CMC-Na).

The negative electrode current collector may use a metal foil material or a porous metal plate with good electrical conductivity and mechanical properties, for example, copper foil.

The negative electrode plate may be prepared by using a conventional method in the art. For example, the negative electrode active material, the conductive agent, the binder, and the thickener are dispersed in a solvent which may be N-methylpyrrolidone (NMP) or deionized water, to obtain a uniform negative electrode slurry. The negative electrode slurry is applied on the negative current collector and undergoes processes such as drying by heat and rolling to obtain the negative electrode plate.

In the lithium-ion secondary battery of the embodiments of this application, the electrolyte may be a solid electrolyte, such as a polymer electrolyte or an inorganic solid electrolyte, but is not limited thereto. Alternatively, the electrolyte may be a liquid electrolyte that includes a solvent and a lithium salt dissolved in the solvent.

The solvent may be a non-aqueous organic solvent, for example, one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl acetate (MPC), ethylene propyl carbonate (EPC), methyl fonate (MF), methyl acetate (MA), ethyl acetate (EA), propyl acetate (PA), methyl propionate (MP), Ethyl propionate (EP), propyl propionate (PP), methyl butyrate (MB), and ethyl butyrate (EB). For example, more than two types of solvents are included.

The lithium salt may be one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), UDFOB (lithium difluorooxalate), LiBOB (lithium bisoxalate), $LiPO_2F_2$ (lithium difluorophosphate), LiDFOP (lithium difluorophosphate), and LiTFOP (lithium tetrafluoro oxalate phosphate), for example, one or more of $LiPF_6$ (lithium hexafluorophosphate), $LiBF_4$ (lithium tetrafluoroborate). LiBOB (lithium bisoxalate), LiDFOB (lithium difluorooxalate), LiTFSI (lithium bistrifluoromethanesulfonimide), and iFSI (lithium bisfluorosulfonimide).

The liquid electrolyte may further optionally include other additives, for example, one or more of vinylene carbonate (VC), vinyl ethylene carbonate (VEC), fluoroethylene carbonate (FEC), difluoroethylene carbonate (DFEC), 3,3,3-trifluoropropylene carbonate (TFPC), succinonitrile (SN), adiponitrile (ADN), glutaronitrile (GLN), hexanetrinitrile (HTN), 1,3-propane sultone (1,3-PS), ethylene sulfate (DTD), methylene methyl disulfonate (MMDS), 1-propene-1,3-sultone (PST), 4-methylvinyl sulfate (PCS), 4-ethyl ethylene sulfate (PES), 4-propyl ethylene sulfate (PEGLST), trimethylene sulfate (TS), 1,4-butane sultone (1,4-BS), dioxathiolane 2-oxide (DTO), dimethyl sulfite (DMS), diethyl sulfite (DES), sulfonate cyclic quaternary ammonium salt, tris(trimethylsilyl) phosphate (TMSP), and tris (trimethylsiloxy)boron (TMSB), but is not limited thereto.

The lithium-ion secondary battery in the embodiments of this application imposes no particular limitation on the separator, and any well-known porous separator with electrochemical stability and mechanical stability may be selected, for example, a mono-layer or multi-layer membrane of one or more of glass fiber, nonwoven fabric, polyethylene (PE), polypropylene (PP), and polyvinylidene fluoride (PVDF).

The positive electrode plate and the negative electrode plate are stacked alternately with a separator provided between the positive electrode plate and the negative electrode plate for separation, to obtain a cell, or the stack is further wound to obtain a cell. The cell is placed into a housing, a liquid electrolyte is injected, and the package is then sealed, to obtain a lithium-ion secondary battery.

Figure 3:
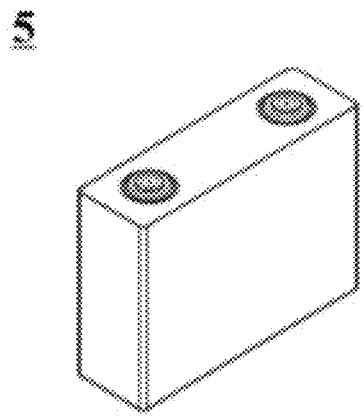
FIG. 3 is a schematic diagram of an embodiment of a lithium-ion secondary battery.

The shape of the lithium-ion secondary battery is not particularly limited in this application, which may be of a cylindrical shape, a square shape, or any other shape. FIG. 3 shows a lithium-ion secondary battery 5 of a square structure as an example.

In some embodiments, the lithium-ion secondary battery may include an outer package. The outer package is used for packaging the positive electrode plate, the negative electrode plate, and the electrolyte.

Figure 4:
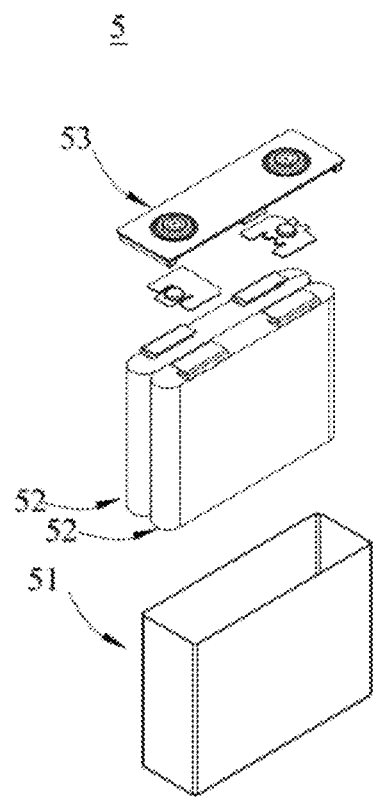
FIG. 4 is an exploded view of FIG. 3.

In some embodiments, with reference to FIG. 4, the outer package may include a housing 51 and a cover plate 53. The housing 51 may include a bottom plate and side plates connected to the bottom plate, and the bottom plate and the side plate enclose an accommodating cavity. The housing 51 has an opening communicating with the accommodating cavity, and the cover plate 53 can cover the opening to close the accommodating cavity.

The positive electrode plate, the negative electrode plate, and the separator may be wound or laminated to form a cell 52. The cell 52 is packaged in the accommodating cavity. The electrolyte may be a liquid electrolyte infiltrating into the cell 52. There may be one or more cells 52 in the lithium-ion secondary battery 5, and their quantity may be adjusted as required.

In some embodiments, the outer package of the lithium-ion secondary battery may be a hard shell, such as a hard-plastic shell, an aluminum shell, or a steel shell. The outer package of the lithium-ion secondary battery may alternatively be a soft package, for example, a soft bag. A material of the soft package may be plastic, for example, including one or more of polypropylene (PP), polybutylene terephthalate (PBT), polybutylene succinate (PBS), and the like.

In some embodiments, lithium-ion secondary batteries may be combined to assemble a battery module, and the battery module may include a plurality of lithium-ion secondary batteries. The specific quantity may be adjusted based on the use case and capacity of the battery module.

Figure 5:
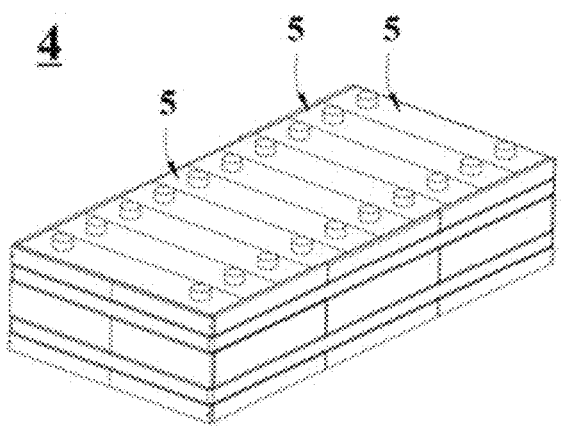
FIG. 5 is a schematic diagram of an embodiment of a battery module.

FIG. 5 shows a battery module 4 used as an example. With reference to FIG. 5, in the battery module 4, a plurality of lithium-ion secondary batteries 5 may be sequentially arranged in a length direction of the battery module 4. Certainly, the plurality of lithium-ion secondary batteries may be arranged in any other manner. Further, the plurality of lithium-ion secondary batteries 5 may be fixed by using fasteners.

Optionally, the battery module 4 may further include an enclosure with an accommodating space, and the plurality of lithium-ion secondary batteries 5 are accommodated in the accommodating space.

In some embodiments, battery modules may be further combined to assemble a battery pack, and a quantity of battery modules included in the battery pack may be adjusted based on the use case and capacity of the battery pack.

Figure 6:
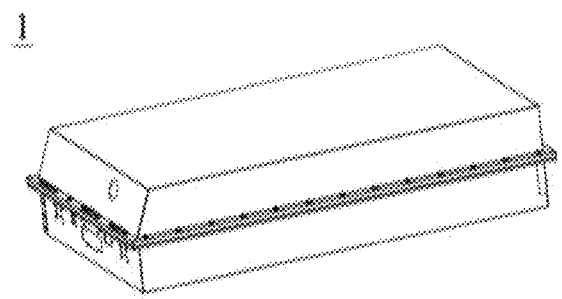
FIG. 6 is a schematic diagram of an embodiment of a battery pack.
Figure 7:
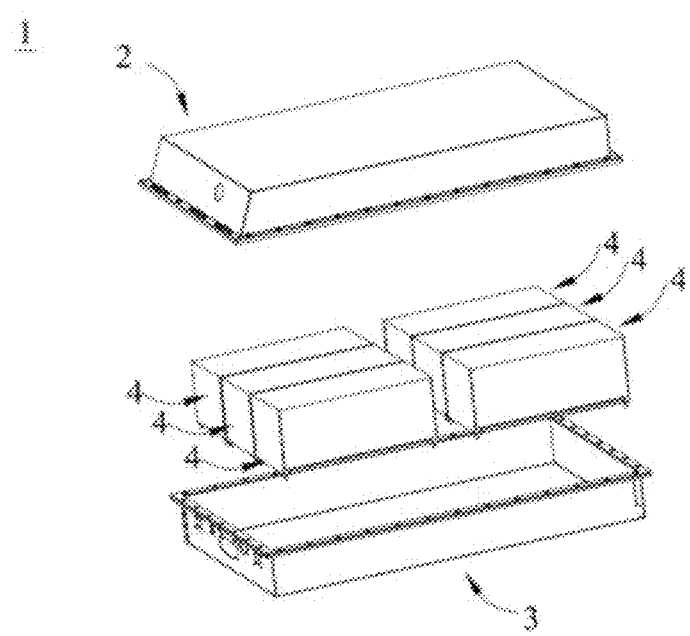
FIG. 7 is an exploded view of FIG. 6.

FIG. 6 and FIG. 7 show a battery pack 1 used as an example. With reference to FIG. 6 and FIG. 7, the battery pack 1 may include a battery box and a plurality of battery modules 4 disposed in the battery box. The battery box includes an upper box body 2 and a lower box body 3. The upper box body 2 can cover the lower box body 3 to form an enclosed space for accommodating the battery modules 4. The plurality of battery modules 4 may be arranged in the battery box in any manner.

This application further provides an apparatus. The apparatus includes at least one of the lithium-ion secondary battery, the battery module, or the battery pack in this application. The lithium-ion secondary battery, battery module, or battery pack may be used as a power source for the apparatus, or an energy storage unit of the apparatus. The apparatus may be, but is not limited to, consumer electronics, electric vehicles, and the like. In a specific example, the apparatus may be a mobile device (for example, a mobile phone, a tablet computer, or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A lithium-ion secondary battery a battery module, or a battery pack may be selected for the apparatus according to a use requirement of the apparatus.

Figure 8:
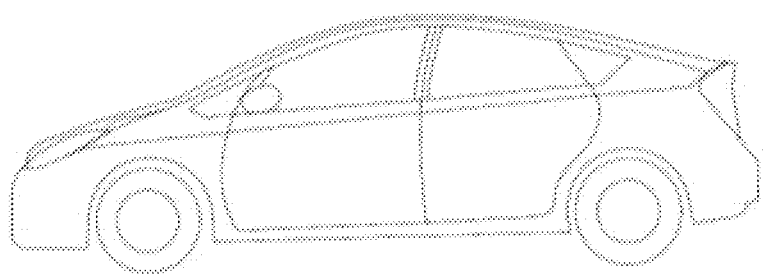
FIG. 8 is a schematic diagram of an embodiment of an apparatus using a lithium-ion secondary battery as a power source.

FIG. 8 shows an apparatus used as an example. The apparatus is an electric vehicle, which may be a battery electric vehicle, a hybrid electric vehicle, a plug-in hybrid electric vehicle, or the like. To meet a requirement of the apparatus for high power and high energy density of the secondary battery, a battery pack or a battery module may be used.

EXAMPLES

Content disclosed in this application is described in detail in the following examples. These examples are intended only for illustrative purposes because various modifications and changes made without departing from the scope of the content disclosed in this application are apparent to those skilled in the art. Unless otherwise stated, all parts, percentages, and ratios reported in the following examples are based on mass, all reagents used in the examples are commercially available or synthesized in a conventional manner, and can be used directly without further treatment, and all instruments used in the examples are commercially available.

Example 1

Preparation of a Positive Electrode Active Material (1) A nickel-cobalt-manganese ternary material precursor $[Ni_{0.8}Co_{0.1}Mn_{0.1}](OH)_2$, lithium hydroxide LiOH, and antimony trioxide $Sb_2O_3$ were added to a high-speed mixer and mixed for 1 hour to obtain a mixture. A molar ratio Li/Me of the nickel-cobalt-manganese ternary material precursor to lithium hydroxide was 1.05, where Me represented a total number of moles of Ni, Co, and Mn in the nickel-cobalt-manganese ternary material precursor, and an added amount of $Sb_2O_3$ made a true doping concentration of Sb in the positive electrode active material be 25050 $\mu g/cm^3$. The mixture was placed into an atmosphere sintering furnace and sintered for 15 hours at a temperature of 825° C. in an oxygen-containing atmosphere with an $O_2$ concentration of 900%. A resulting mixture was crushed and sieved to obtain bulk particles, with uniform doping of Sb in a bulk phase structure of the bulk particle.

(2) The bulk particles and aluminum oxide $Al_2O_3$ were added into the high-speed mixer and mixed for 1 hour. An added amount of $Al_2O_3$ made a concentration of Al in the coating layer be 3002 ppm, and the concentration refers to a concentration of Al in the positive electrode active material. The mixed materials were placed into the atmosphere sintering furnace and sintered for 8 hours at a temperature of 310° C. in an oxygen-containing atmosphere with an $O_2$ concentration of 90%, to casuse an $Al_2O_3$ coating layer to be formed on the exterior surface of the bulk particle, so that the positive electrode active material was obtained. A median particle size $D_v50$ of the positive electrode active material was 14 $\mu m$, and a thickness T of the coating layer was 0.243 $\mu m$.

Preparation of an Electrolyte

EC, DEC, and DMC were mixed at a volume ratio of 1:1:1 to obtain a solvent, and a lithium salt $LiPF_6$ was dissolved in the solvent to obtain an electrolyte, where a concentration of $LiPF_6$ was 1 mol/L.

Preparation of a Button Battery

The prepared positive electrode active material, conductive carbon black and PVDF as a binder were dispersed into a solvent N-methylpyrrolidone (NMP) at a mass ratio of 90:5:5 and mixed well to obtain a positive electrode slurry. The positive electrode slurry was uniformly applied on the positive electrode current collector aluminum foil, followed by drying and cold pressing, to obtain a positive electrode plate.

In a button box, the positive electrode plate, the separator, and a lithium-metal sheet were stacked in sequence, and the foregoing electrolyte was injected to obtain a button battery.

Preparation of a Full Battery

The prepared positive electrode active material, a conductive agent acetylene black, and a binder PVDF were dispersed into a solvent NMP at a mass ratio of 94:3:3 and mixed well to obtain a positive electrode slurry. The positive electrode slurry was uniformly applied on the positive electrode current collector aluminum foil, followed by drying and cold pressing to obtain a positive electrode plate.

A negative electrode active material artificial graphite, hard carbon, a conductive agent acetylene black, a binder styrene butadiene rubber (SBR), and a thickener sodium carboxymethyl cellulose (CMC) were dispersed in deionized water at a mass ratio of 90:5:2:2:1, and were mixed well, to obtain a negative electrode slurry. The negative electrode slurry was uniformly applied on the negative electrode current collector aluminum foil, followed by drying and cold pressing to obtain a negative electrode plate.

A polyethylene (PE) porous polymer film was used as a separator. The positive electrode plate, the separator, and the negative electrode plate were stacked in sequence, to obtain a bare cell. The bare cell was placed in an outer package, the foregoing electrolyte was injected, and the package was sealed. After processes such as formation, a full battery was obtained.

Examples 2 to 28 and Comparative Examples 1 to 8

The difference from Example 1 is that relevant parameters in the preparation steps of the positive electrode active material were changed to obtain positive electrode active materials with predetermined parameter characteristics. Details are shown in Table 1-1 to Table 1-2.

The precursor of the positive electrode active materials in Examples 2 to 25 and Comparative Examples 1 to 5 was $[Ni_{0.8}Co_{0.1}Mn_{0.1}](OH)_2$; and the precursor of the positive electrode active materials in Examples 26 to 28 and Comparative Examples 6 to 8 was $[Ni_{0.5}Co_{0.2}Mn_{0.3}](OH)_2$.

The precursor of element $M^1$ in Example 2 was TiO; the precursor of element $M^1$ in Examples 3, 20, 21, 24, and 25 was $NbO_2$; the precursor of element $M^1$ in Example 4 was $MoO_2$; the precursor of element $M^1$ in Example 5 was $RuO_2$; the precursor of element $M^1$ in Example 6 was $V_2O_3$; the precursor of element $M^1$ in Examples 7, 22, 23, and 27 was $WO_2$; the precursors of element $M^1$ in Example 8 were $Sb_2O_3$ and $WO_2$, and the two precursors had basically the same amount: the precursor of element $M^1$ in Comparative Example 4 was $Y_2O_3$; and the precursor of element $M^1$ in Comparative Example 5 was MgO.

The other precursors of element $M^2$ that were different from those in Example 1 were selected from $B_2O_3$, $ZrO_2$, ZnO, and $Y_2O_3$.

In Example 20, the sintering temperature was 615° C., and the sintering duration was 5 hours in step (1); and the sintering temperature was 305° C., and the sintering duration was 8 hours in step (2).

In Example 21, the sintering temperature was 550° C., and the sintering duration was 2 hours in step (1); and the sintering temperature was 290° C., and the sintering duration was 9 hours in step (2).

In Example 22, the sintering temperature was 810° C. and the sintering duration was 15 hours in step (1); and the sintering temperature was 110° C., and the sintering duration was 3 hours in step (2).

In Example 23, the sintering temperature was 830° C., and the sintering duration was 15 hours in step (1); and the sintering temperature was 550° C., and the sintering duration was 20 hours in step (2).

In Example 24, the sintering temperature was 770° C., and the sintering duration was 16 hours in step (1); and the sintering temperature was 310° C., and the sintering duration was 7 hours in step (2).

In Example 25, the sintering temperature was 750° C., and the sintering duration was 17 hours in step (1); and the sintering temperature was 260° C., and the sintering duration was 9 hours in step (2).

In Examples 26 and 27 and Comparative Example 7, the sintering temperature was 790° C., and the sintering duration was 12 hours in step (1); and the sintering temperature was 280° C., and the sintering duration was 7 hours in step (2).

In Example 28, the sintering temperature was 500° C., and the sintering duration was 2 hours in step (1); and the sintering temperature was 240° C., and the sintering duration was 6 hours in step (2).

In Comparative Example 1 and Comparative Example 6, no doping or coating were performed, and only one sintering treatment was performed in both comparative examples. In Comparative Example 1, the sintering temperature was 825° C., and the sintering duration was 15 hours; and in Comparative Example 6, the sintering temperature was 790° C., and the sintering duration was 12 hours.

No element $M^1$ was doped in Comparative Example 2 and Comparative Example 7.

In Comparative Example 3 and Comparative Example 8, no element M2 coating was applied, and only one sintering treatment was performed in both comparative examples. In Comparative Example 3, the sintering temperature was 825° C. and the sintering duration was 15 hours; and in Comparative Example 8, the sintering temperature was 790° C., and the sintering duration was 12 hours.

For other parameters, refer to Table 1-1 and Table 1-2. In Table 1-1 and Table 1-2:

σ represented the relative deviation of local mass concentration of element $M^1$ in the bulk particle:
the concentration of element $M^1$ was the true doping concentration of element $M^1$ in the positive electrode active material;
the concentration of element $M^2$ was the concentration of element $M^2$ in the positive electrode active material:
the molar ratio was a molar ratio of element $M^1$ to element $M^2$ in the positive electrode active material; and
T/$\overline{D}$ represented a ratio of a thickness T of the coating layer to an average particle size $\overline{D}$ of the positive electrode active material.

Test (1) Test of Average Valence of Element $M^1$ and Average Valence of Element $M^2$ of the Positive Electrode Active Material in Different Delithiated States Eighteen button batteries were charged at 25° C. at a constant current of 1C to the upper limit of the charge and discharge cut-off voltages, then charged at a constant voltage to a current less than or equal to 0.05 mA, after that, left standing for 2 minutes, and then discharged at a constant current of 1C to the lower limit of the charge and discharge cut-off voltages.

Then, the charged and then discharged 18 button batteries were respectively charged to 2.8 V, 2.9 V, 3.0 V, 3.1 V, 3.2 V, 3.3 V, . . . , 4.0 V, 4.1 V, 4.2 V, 4.3 V, 4.4 V, and 4.5 V (that is, the charging voltage step was 0.1 V) at a rate of 0.1C. Each charged button battery was taken and disassembled in a drying room to obtain a positive electrode plate as a sample. After the mass of the sample was weighed and recorded, the sample was placed into a digestion tank, and 10 mL of aqua regia as a digestion reagent was slowly added. Then, the tank was placed into a Mars5 microwave digestion instrument from CEM company in USA, and digestion was carried out at a microwave emission frequency of 2450 Hz. The digested sample solution was transferred to a volumetric flask, shaken well, and sampled. The sampled solution was placed into a 7000DV inductively coupled plasma-emission spectrometer (ICP-OES) sample introduction system from PE company in USA, then mass concentration tests for Li, O, Ni, Co, Mn and the doping element in the positive electrode active material were performed at 0.6 MPa argon pressure and 1300 W radio frequency power. Chemical formulas at each voltage were obtained through conversion based on the mass concentration of each element, and then delithiated states at each voltage were obtained. For example, a chemical formula obtained for the positive electrode active material through conversion at a voltage of 2.8 V was $Li_{0.89}Ni_{0.8}Co_{0.1}Mn_{0.1}O_2$, and then a corresponding delithiated state was $(1-0.89) \times 100\% = 11\%$, which means the battery voltage corresponding to the 11% delithiated state was 2.8 V, Similarly, when a chemical formula obtained for the positive electrode active material through conversion in an ICP-OES test was $Li_{0.22}Ni_{0.8}Co_{0.1}Mn_{0.1}O_2$, a corresponding voltage was a voltage corresponding to the 78% delithiated state.

After the voltages corresponding to the 11% delithiated state and the 78% delithiated state were obtained, electrode plates containing the positive electrode active material to be tested were taken, and button batteries were prepared according to the above method. The button batteries were respectively charged at 25° C. at a rate of 0.1C to the voltages corresponding to the 11% delithiated state and 78% delithiated state, and then the following operations were performed:

(i) A button cell was cut open with a pair of scissors in a drying room to take out an entire positive electrode plate, the positive electrode plate was put into a beaker, and an appropriate amount of highly pure anhydrous dimethyl carbonate (DMC) was added. The DMC was renewed every 8 hours, and the positive electrode plate was consecutively cleaned for 3 times, then placed into a vacuum standing box in the drying room, and dried for 12 hours in a vacuumed state of −0.096 MPa. Powder was scrapped from the dried positive electrode plate in the drying room with a blade for grinding, and approximately 50 mg of the positive electrode active material powder was weighed and taken.

(ii) The surface of a piece of aluminum foil of approximately 2 cm×2 cm was wiped clean with acetone, a double-sided tape of approximately 1 cm×1 cm was cut out and pasted on the center of the aluminum foil, the powder sample was spread on the double-sided tape, and made evenly distributed across the entire double-sided tape with a clean stainless-steel sampling spoon. Another piece of aluminum foil clean with acetone was taken to cover the sample, and the entire piece was placed between two flat stainless-steel modules, and then pressed by using a tablet press at a pressure of about 10 MPa for 15 seconds.

(iii) The pressed sample was placed into a sample chamber of an escalab 250Xi X-ray photoelectron spectrometer from Thermo Fisher Scientific (Thermo) in USA, and a monochromatic Al Kα (hv=1486.6 eV) excitation source, X-ray power of 150 W, and a focusing spot 500 µm were set. 2p or 3d spectra of element $M^1$ and element $M^2$ were collected for peak fitting with XPSpeak software, valence distributions of element $M^1$ and element $M^2$ were determined, and an average valence of element $M^1$ and an average valence of element $M^2$ were respectively calculated.

Figure 2:
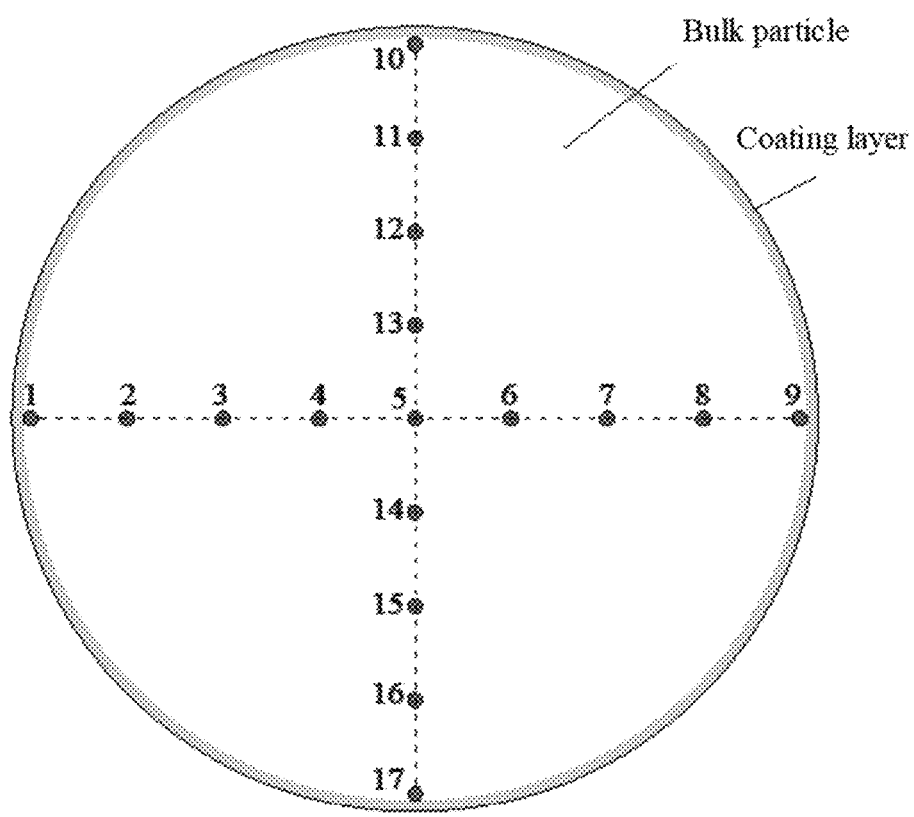
FIG. 2 is a schematic diagram of point sampling locations in relative deviation tests for local mass concentration of element $M^1$ in a bulk particle of a positive electrode active material according to Examples 1 to 28 and Comparative Examples 1 to 8.

(2) Test of Relative Deviation of Local Mass Concentration of Element $M^1$ in the Bulk Particles 2 g of the positive electrode active material powder sample was weighed and taken, evenly sprinkled on the sample stage pasted with conductive adhesive, and then lightly pressed to fix the powder. Alternatively, a 1 cm×1 cm electrode plate was cut out from the positive electrode plate of the battery and pasted on the sample stage as a sample to be tested. The sample stage was loaded into a vacuum sample chamber and fixed, an IB-09010CP cross section polisher from the electronic company JEOL in Japan was used to prepare a cross section of a particle of the positive electrode active material, that is, a cross section of a bulk particle, as shown in FIG. 2, and points were taken with reference to 17 sites of the cross section of the secondary particle shown in FIG. 2 with an area 20 nm×20 nm of each point. The X-Max energy dispersive spectrometer (EDS) from Oxford Instruments Group in UK was used together with a Sigma-02-33 scanning electron microscope (SEM) from ZEISS in German to test the mass concentration of element $M^1$ at the 17 sites. A test method was as follows: Li, O, Ni, Co, Mn, and the doping elements were selected as the to-be-tested elements, SEM parameters of a 20 kV acceleration voltage, a 60 µm diaphragm, an 8.5 mm working distance, and a 2.335 A current were set, and during the EDS test, when a spectrum area reached more than 250000 cts (controlled by acquisition time and an acquisition rate), the test stopped, data was collected, and the mass concentrations of element $M^1$ at the sites were obtained and denoted respectively as $\eta_1, \eta_2, \eta_3, \ldots,$ and $\eta_{17}$.

The method of determination of the average mass concentration $\bar{\eta}$ of element $M^1$ in the bulk particle was as follows: The foregoing EDS-SEM measurement method was used, and as shown in a dashed box in FIG. 2, a test area covered all the scanned points of the foregoing bulk particle, and did not exceed the cross-section of the bulk particle.

After that, a relative deviation a of local mass concentration of element $M^1$ in the bulk particles is calculated according to the foregoing equation (1).

(3) Test of Concentrations of Element $M^1$ and Element $M^2$ in the Positive Electrode Active Material A PE 7000DV ICP-OES was used to measure concentrations of elements $M^1$ and $M^2$ in the positive electrode active material. A test method was as follows: An electrode plate containing the positive electrode active material was taken and die cut into a disc with total mass greater than 0.5 g, or at least 5 g of the positive electrode active material powder sample was weighed, recorded, and placed into a digestion tank, 10 mL of aqua regia as a digestion reagent was slowly added. After that, the sample was placed into the Mars5 microwave digestion apparatus from CEM company in USA, and digestion was carried out at a microwave emission frequency of 2450 Hz. The digested sample solution was transferred to a volumetric flask, shaken well, and sampled. The sampled solution was placed into the ICP-OES sample introduction system, and tests for concentrations of elements $M^1$ and $M^2$ in the positive electrode active material were performed at 0.6 MPa argon pressure and 1300 W radio frequency power.

A true density $\rho_{true}$ of the positive electrode active material was measured by using a TD2400 powder true densitometer from Beijing Builder Electronic Technology Co., Ltd. A measurement method was as follows: At 25° C., a positive electrode active material with specific mass was taken and placed into a sample beaker, and the mass m of the positive electrode active material was recorded; the sample beaker containing the positive electrode active material was put into a test chamber of the true densitometer, the test system was sealed, and an inert gas with a small molecular diameter, such as helium or nitrogen, was introduced. A true volume V of the tested material was determined by measuring pressure of the gas in the sample chamber and an expansion chamber and based on Bohr's law PV=nRT, and the true density $\rho_{true}$ of the secondary particles was calculated according to m/V. Herein, n is the number of moles of gas in the sample beaker; R was an ideal gas constant and was set to 8.314; and T was an ambient temperature and was 298.15K. Then a true doping concentration ω of the positive electrode active material was calculated according to the foregoing equation (2).

(4) Initial Gram Capacity Test of the Button Battery

The button battery was charged at 25° C. at a constant current of 0.1C to the upper limit of the charge and discharge cut-off voltages, then charged at a constant voltage to a current less than or equal to 0.05 mA, after that, left standing for 2 minutes, and then discharged at a constant current of 0.1C to the lower limit of the charge and discharge cut-off voltages. The discharge capacity in this case was the initial gram capacity of the button battery.

(5) Test of Initial Gram Capacity of the Full Battery

The battery was charged at 25° C. at a constant current of ⅓ C to the upper limit of the charge and discharge cut-off voltages, then charged at a constant voltage to a current less than or equal to 0.05 mA, after that, left standing for 5 minutes, and then discharged at a constant current of ⅓ C to the lower limit of the charge and discharge cut-off voltages. The discharge capacity in this case was the initial gram capacity of the full battery.

(6) Test of High-Temperature Cycling Performance of the Full Battery

The battery was charged at 45° C. at a constant current of 1C to the upper limit of the charge and discharge cut-off voltages, then charged at a constant voltage to a current less than or equal to 0.05 mA, after that, left standing for 5 minutes, and then discharged at a constant current of 1C to the lower limit of the charge and discharge cut-off voltages. This was one charge-discharge cycle. The discharge capacity in this case was recorded as the discharge specific capacity $D_1$ at the first cycle. A total of 400 charge-discharge cycles were performed on the battery according to the foregoing method, and a discharge specific capacity $D_{400}$ at the 400$^{th}$ cycle was recorded.

Capacity retention rate of full battery after 400
cycles at 45° C. and 1C/1C(%)=$D_{400}/D_1$×100%

(7) Test of High-Temperature Storage Performance of the Full Battery

The battery was charged at 25° C. at a constant current rate of 1C to the upper limit of the charge and discharge cut-off voltages, then charged at a constant voltage to a current less than or equal to 0.05 mA, and a volume of the battery at that time was measured and denoted as Vo. Then the battery was placed into a constant-temperature box at 80° C. for storage for 10 days, and a volume of the battery after storage for 10 days was measured and denoted as $V_1$. In this test, the drainage method was used to measure the volume of the battery.

Volume swelling rate ΔV of full battery after storage
at 80° C. for 10 days (%)=$(V_1-V_0)/V_0$×100%

In the tests (1), (4), and (7),
in Examples 1 to 25 and Comparative Examples 1 to 5, the charge and discharge cut-off voltage of the button battery ranged from 2.8 V to 4.25 V, and the charge and discharge cut-off voltage of the full battery ranged from 2.8 V to 4.2 V,
in Examples 26 to 28 and Comparative Examples 6 to 8, the charge and discharge cut-off voltage of the button battery ranged from 2.8 V to 4.35 V, and the charge and discharge cut-off voltage of the full battery ranged from 2.8 V to 4.3 V.

Table 2 shows test results of Examples 1 to 28 and Comparative Examples 1 to 8.

TABLE 1-1

| Number | Element M$^1$ | | | | | Element M$^2$ | | | Molar ratio M$^1$:M$^2$ | True density (g/cm$^3$) | $D_v$50 (μm) | T (μm) | T/$\overline{D}$ | Specific surface area (m$^2$/g) |
|---|---|---|---|---|---|---|---|---|---|---|---|---|---|---|
| | Type | True doping concentration (μg/cm$^3$) | $α^1$ | $α^2 > α^1$? | σ (%) | Type | Concentration (ppm) | $β^1$ = $β^2$? | | | | | | |
| Example 1 | Sb | 25050 | +3 | Yes | 9 | Al | 3002 | Yes | 1.78 | 4.7 | 14 | 0.243 | 0.017 | 0.7 |
| Example 2 | Ti | 25040 | +2 | Yes | 10 | B | 3154 | Yes | 1.72 | 4.6 | 13 | 0.251 | 0.019 | 0.8 |
| Example 3 | Nb | 25130 | +4 | Yes | 11 | Zr | 2978 | Yes | 1.80 | 4.7 | 15 | 0.245 | 0.016 | 0.4 |
| Example 4 | Mo | 24895 | +4 | Yes | 8 | Al | 2896 | Yes | 1.83 | 4.7 | 13 | 0.210 | 0.016 | 0.6 |
| Example 5 | Ru | 25034 | +4 | Yes | 9 | Zn | 3018 | Yes | 1.69 | 4.9 | 16 | 0.234 | 0.015 | 0.5 |
| Example 6 | V | 24915 | +3 | Yes | 12 | Al | 3121 | Yes | 1.66 | 4.8 | 14 | 0.229 | 0.016 | 0.7 |
| Example 7 | W | 25031 | +4 | Yes | 10 | Y | 2994 | Yes | 1.74 | 4.8 | 15 | 0.267 | 0.018 | 0.9 |
| Example 8 | Sb + W | 25047 | +4 | Yes | 9 | B | 3054 | Yes | 1.74 | 4.7 | 14 | 0.255 | 0.018 | 0.5 |
| Example 9 | Sb | 2000 | +3 | Yes | 9 | Al | 4987 | Yes | 0.09 | 4.7 | 15 | 0.210 | 0.014 | 0.5 |
| Example 10 | Sb | 2300 | +3 | Yes | 10 | Al | 4879 | Yes | 0.10 | 4.9 | 16 | 0.253 | 0.016 | 0.6 |
| Example 11 | Sb | 3000 | +3 | Yes | 8 | Al | 2989 | Yes | 0.21 | 4.7 | 15 | 0.241 | 0.016 | 0.5 |
| Example 12 | Sb | 11028 | +3 | Yes | 11 | Al | 3102 | Yes | 0.74 | 4.8 | 14 | 0.251 | 0.018 | 0.7 |
| Example 13 | Sb | 30000 | +3 | Yes | 12 | Al | 3018 | Yes | 2.11 | 4.7 | 15 | 0.245 | 0.016 | 0.6 |
| Example 14 | Sb | 49000 | +3 | Yes | 10 | Al | 2899 | Yes | 3.67 | 4.6 | 16 | 0.252 | 0.016 | 0.5 |
| Example 15 | Sb | 53120 | +3 | Yes | 9 | Al | 2987 | Yes | 3.78 | 4.7 | 15 | 0.257 | 0.017 | 0.7 |
| Example 16 | Sb | 7840 | +3 | Yes | 12 | Al | 500 | Yes | 3.41 | 4.6 | 14 | 0.247 | 0.018 | 0.6 |
| Example 17 | Sb | 24951 | +3 | Yes | 10 | Al | 5000 | Yes | 1.06 | 4.7 | 15 | 0.250 | 0.017 | 0.5 |
| Example 18 | Sb | 25011 | +3 | Yes | 11 | Al | 6400 | Yes | 0.81 | 4.8 | 16 | 0.246 | 0.015 | 0.6 |

TABLE 1-2

(Continued from Table 1-1)

| | Element M¹ | | | | | Element M² | | | | | | | Specific |
|---|---|---|---|---|---|---|---|---|---|---|---|---|---|
| Number | Type | True doping concentration (μg/cm³) | $\alpha^1$ | $\alpha^2 > \alpha^1$? | $\sigma$ (%) | Type | Concentration (ppm) | $\beta^1 = \beta^2$? | Molar ratio M¹:M² | True density (g/cm³) | $D_v50$ (μm) | T (μm) | T/$\overline{D}$ | surface area (m²/g) |
| Example 19 | Sb | 43701 | +3 | Yes | 10 | Al | 3100 | Yes | 3.00 | 4.7 | 14 | 0.253 | 0.018 | 0.7 |
| Example 20 | Nb | 25078 | +4 | Yes | 20 | Al | 3025 | Yes | 1.80 | 4.6 | 15 | 0.249 | 0.017 | 0.6 |
| Example 21 | Nb | 25104 | +4 | Yes | 30 | Al | 3081 | Yes | 1.77 | 4.6 | 15 | 0.257 | 0.017 | 0.7 |
| Example 22 | W | 25310 | +4 | Yes | 10 | Al | 3190 | Yes | 1.65 | 4.8 | 14 | 0.040 | 0.003 | 0.9 |
| Example 23 | W | 25351 | +4 | Yes | 9 | Al | 3201 | Yes | 1.72 | 4.6 | 17 | 0.428 | 0.025 | 0.4 |
| Example 24 | Nb | 25033 | +4 | Yes | 11 | Al | 2874 | Yes | 1.85 | 4.7 | 14 | 0.237 | 0.017 | 1.7 |
| Example 25 | Nb | 24989 | +4 | Yes | 12 | Al | 2863 | Yes | 1.68 | 5.2 | 16 | 0.248 | 0.016 | 0.6 |
| Example 26 | Sb | 25047 | +3 | Yes | 10 | Al | 3012 | Yes | 1.77 | 4.7 | 15 | 0.251 | 0.017 | 0.7 |
| Example 27 | W | 25081 | +4 | Yes | 8 | Al | 3051 | Yes | 1.79 | 4.6 | 17 | 0.248 | 0.015 | 0.6 |
| Example 28 | Sb | 24997 | +3 | Yes | 32 | Al | 2990 | Yes | 1.78 | 4.7 | 16 | 0.250 | 0.016 | 0.5 |
| Comparative Example 1 | / | / | / | / | / | / | / | / | / | 4.7 | 15 | / | / | 0.6 |
| Comparative Example 2 | / | / | / | / | / | Al | 3054 | Yes | / | 4.7 | 16 | 0.221 | 0.014 | 0.6 |
| Comparative Example 3 | Sb | 25190 | +3 | Yes | 10 | / | / | / | / | 4.7 | 15 | / | / | 0.6 |
| Comparative Example 4 | Y | 25115 | +3 | No | 11 | Al | 2998 | Yes | 1.78 | 4.7 | 16 | 0.247 | 0.015 | 0.7 |
| Comparative Example 5 | Mg | 25080 | +2 | No | 10 | Al | 3011 | Yes | 1.74 | 4.8 | 14 | 0.250 | 0.018 | 0.6 |
| Comparative Example 6 | / | / | / | / | / | / | / | / | / | 4.8 | 14 | / | / | 0.7 |
| Comparative Example 7 | / | / | / | / | / | Al | 2984 | Yes | / | 4.8 | 14 | 0.238 | 0.017 | 0.5 |
| Comparative Example 8 | Sb | 24890 | +3 | Yes | 8 | / | / | / | / | 4.8 | 13 | / | / | 0.7 |

TABLE 2

| Number | Initial gram capacity of button battery (mAh/g) | Initial gram capacity of foil battery (mAh/g) | Cycling capacity retention rate of full battery (%) | Volume swelling ratio of full battery (%) |
|---|---|---|---|---|
| Example 1 | 208.5 | 197.6 | 93.24 | 4.3 |
| Example 2 | 207.1 | 196.3 | 91.51 | 5.8 |
| Example 3 | 206.8 | 197.1 | 92.56 | 4.1 |
| Example 4 | 206.7 | 197.4 | 91.43 | 8.6 |
| Example 5 | 207.4 | 196.8 | 93.05 | 7.4 |
| Example 6 | 205.9 | 194.7 | 92.81 | 6.7 |
| Example 7 | 206.6 | 196.7 | 91.52 | 5.3 |
| Example 8 | 207.1 | 195.9 | 92.07 | 7.9 |
| Example 9 | 203.6 | 194.5 | 87.38 | 29.4 |
| Example 10 | 204.7 | 194.8 | 88.24 | 21.7 |
| Example 11 | 205.2 | 195.4 | 89.76 | 15.3 |
| Example 12 | 207.1 | 196.6 | 92.14 | 8.7 |
| Example 13 | 206.4 | 195.7 | 90.06 | 12.4 |
| Example 14 | 204.5 | 194.8 | 88.76 | 20.6 |
| Example 15 | 201.2 | 191.3 | 86.22 | 31.5 |
| Example 16 | 206.1 | 196.8 | 89.57 | 45.8 |
| Example 17 | 203.7 | 192.4 | 85.93 | 21.4 |
| Example 18 | 201.4 | 191.3 | 84.21 | 16.7 |
| Example 19 | 204.8 | 194.6 | 85.47 | 15.9 |
| Example 20 | 203.1 | 190.8 | 88.34 | 20.1 |
| Example 21 | 201.8 | 189.7 | 84.27 | 23.6 |
| Example 22 | 206.9 | 196.8 | 87.31 | 28.9 |
| Example 23 | 203.5 | 192.1 | 86.63 | 7.2 |
| Example 24 | 205.7 | 196.4 | 85.24 | 34.1 |
| Example 25 | 201.3 | 191.0 | 87.51 | 27.3 |
| Example 26 | 178.4 | 173.8 | 95.37 | 4.6 |
| Example 27 | 179.1 | 174.5 | 94.28 | 3.5 |
| Example 28 | 173.6 | 168.8 | 88.05 | 21.7 |
| Comparative Example 1 | 198.3 | 187.2 | 81.54 | 62.3 |
| Comparative Example 2 | 197.8 | 187.0 | 86.59 | 22.6 |
| Comparative Example 3 | 206.2 | 196.4 | 91.28 | 23.9 |
| Comparative Example 4 | 197.3 | 187.2 | 85.32 | 28.6 |
| Comparative Example 5 | 196.8 | 185.9 | 86.19 | 33.1 |
| Comparative Example 6 | 171.1 | 168.7 | 83.35 | 38.9 |
| Comparative Example 7 | 170.6 | 167.9 | 86.21 | 18.2 |
| Comparative Example 8 | 173.4 | 168.2 | 87.35 | 20.5 |

It can be seen from comparisons of Examples 1 to 25, Examples 26 to 28, and Comparative Examples 6 to 8 that, the bulk particles of the nickel-containing lithium composite oxide were doped with element M¹, and a coating layer containing an oxide of element M² was applied on the exterior surface of the bulk particle; with the delithiation of the positive electrode active material, the average valence of element M¹ was increased, and the average valence of element M² was constant; and element M¹ and element M² each were selected from specific element types. Therefore, the lithium-ion secondary battery could have a relatively high initial gram capacity, good high-temperature cycling performance and good high-temperature storage performance.

It can be seen from the results in Examples 1, and 9 to 19 that, by making the concentrations and molar ratios of element M¹ and element M² in the positive electrode active material be within appropriate ranges, the grain capacity, high-temperature cycling performance and high-temperature storage performance of the battery could be improved.

It can be seen from the results of Examples 3, 20, 21, 26 and 28 that when the relative deviation of local mass concentration of element $M^1$ in the bulk particles was less than 20%, element $M^1$ had better doping uniformity, properties of internal portions of the particles of the positive electrode active material remained the same, and migration and diffusion capabilities of lithium ions in different internal zones of the particles were at a same level. In addition, the overall structural stability of the positive electrode active material uniformly doped with element $M^1$ was better, internal stresses of the material were evenly distributed, and the material was not prone to crack. Therefore, an improvement effect on the battery performance was significant. When the relative deviation of local mass concentration of the doping element in the bulk particles was greater than 20%, diffusion channels and barriers of lithium ions in the internal portions of the particles of the positive electrode active material were inconsistent, and there was a difference in structural stability and deformation resistance of zones, and as a result, internal stresses of the material were unevenly distributed, and a zone with a large internal stress was prone to crack, thereby exposing a fresh surface of the positive electrode active material, increasing impedance, and further exacerbating the capacity performance, high-temperature cycling performance, and high-temperature storage performance.

It can be seen from the results of Examples 7, 22, and 23 that an appropriate ratio of the thickness of the coating layer to the average particle size $\overline{D}$ of the positive electrode active material could be beneficial to make the battery have relatively high gram capacity, high-temperature cycling performance, and high-temperature storage performance.

It can be seen from the results of Examples 3 and 24 that an appropriate specific surface area of the positive electrode active material could be beneficial to make the battery have relatively high gram capacity, high-temperature cycling performance, and high-temperature storage performance.

It can be seen from the results of Examples 3 and 25 that an appropriate true density of the positive electrode active material could be beneficial to make the battery have relatively high gram capacity, good high-temperature cycling performance, and good high-temperature storage performance.

The foregoing descriptions are merely specific embodiments of this application, but are not intended to limit the protection scope of this application. Any equivalent modifications or replacements readily figured out by a person skilled in the art within the technical scope disclosed in this application shall fall within the protection scope of this application. Therefore, the protection scope of this application shall be subject to the protection scope of the claims.

What is claimed is:

1. A positive electrode active material, comprising bulk particles and a coating layer applied on an exterior surface of each of the bulk particles, wherein the bulk particles comprises a lithium composite oxide that contains element nickel and a doping element $M^1$, and the coating layer comprises an oxide of element $M^2$;

when the positive electrode active material is in an 11% delithiated state, an average valence of element $M^1$ is $\alpha^1$, and an average valence of element $M^2$ is $\beta^1$;

when the positive electrode active material is in a 78% delithiated state, an average valence of element $M^1$ is $\alpha^2$, and an average valence of element $M^2$ is $\beta^2$;

$\alpha^1$ and $\alpha^2$ satisfy $\alpha^2 > \alpha^1$, and $\beta^1$ and $\beta^2$ satisfy $\beta^1 = \beta^2$; and element $M^1$ comprises one or more of Si, Ti, Cr, Mo, V, Se, Nb, Ru, Rh, Pd, Sb, Te, Ce, and W, and element $M^2$ is selected from one or more of Mg, Al, Ca, Zr, Zn, Y, and B;

wherein a thickness T of the coating layer ranges from 0.001 μm to 0.5 μm, and the thickness T of the coating layer and an average particle size $\overline{D}$ of the positive electrode active material satisfy: $0.003 \leq T/\overline{D} \leq 0.025$.

2. The positive electrode active material according to claim 1, wherein $\alpha^1$ and $\alpha^2$ satisfy $\alpha^2 > \alpha^1 \geq +3$.

3. The positive electrode active material according to claim 1, wherein $\alpha^1$ is one or more of valences +3, +4, +5, and +6.

4. The positive electrode active material according to claim 1, wherein element $M^1$ comprises one or more of Ti, Mo, V, Nb, Ru, Sb, and W; or element $M^2$ comprises one or more of Al, Zr, Zn, Y, and B.

5. The positive electrode active material according to claim 1, wherein element $M^1$ is doped into the bulk particle and a relative deviation of local mass concentration of element $M^1$ in the bulk particle is less than 32%.

6. The positive electrode active material according to claim 1, wherein in the positive electrode active material, a molar ratio of element $M^1$ to element $M^2$ ranges from 0.09:1 to 4:1.

7. The positive electrode active material according to claim 1, wherein a true doping concentration of element $M^1$ in the positive electrode active material ranges from 2000 μg/cm³ to 55000 μg/cm³; or a concentration of element $M^2$ in the positive electrode active material ranges from 300 ppm to 6500 ppm.

8. The positive electrode active material according to claim 1, wherein a volume-based median particle size $D_v50$ of the positive electrode active material ranges from 8 μm to 20 μm.

9. The positive electrode active material according to claim 1, wherein a thickness T of the coating layer ranges from 0.001 μm to 0.5 μm.

10. The positive electrode active material according to claim 1, wherein the lithium composite oxide is a compound represented by chemical formula 1:

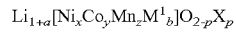

$$Li_{1+a}[Ni_xCo_yMn_zM^1_b]O_{2-p}X_p \qquad \text{chemical formula 1}$$

wherein in the chemical formula 1, X is selected from one or more of F, N, P, and S, $0.5 \leq x < 1$, $0 \leq y < 0.3$, $0 \leq z < 0.3$, $-0.2 < a < 0.2$, $0 < b < 0.2$, $0 \leq p < 0.2$, and $x+y+z+b=1$.

11. The positive electrode active material according to claim 10, wherein when the bulk particles are doped with element X, element X is doped into the bulk particle and a relative deviation of local mass concentration of the doping elements (comprising element $M^1$ and element X) in the bulk particle is less than 32%; or element X shows a mass concentration gradient decreasing from the exterior surface of the bulk particle to the core of the particle; optionally, element X is doped into the exterior surface of the bulk particle.

12. The positive electrode active material according to claim 1, wherein the positive electrode active material further satisfies one or more of the following requirements (1) to (3):

(1) a specific surface area of the positive electrode active material ranges from 0.2 m²/g to 1.5 m²/g;

(2) a true density of the positive electrode active material ranges from 4.6 g/m³ to 5.2 g/m³; or (3) a tap density of the positive electrode active material ranges from 2.3 g/cm$^3$ to 2.8 g/cm$^3$.

13. A lithium-ion secondary battery, comprising a positive electrode plate, wherein the positive electrode plate comprises a positive electrode current collector and a positive electrode active substance layer disposed on the positive electrode current collector, and the positive electrode active substance layer comprises the positive electrode active material according to claim 1.

14. A method for preparing the positive electrode active material according to claim 1, comprising the steps of:
  (a) providing a mixture comprising a nickel-containing transition metal source, a lithium source, and a precursor of element $M^1$, and subjecting the mixture to a sintering treatment to obtain bulk particles doped with element $M^1$; and
  (b) mixing the bulk particles and a precursor of element $M^2$, and subjecting a resulting mixture to a sintering treatment to form on an exterior surface of the bulk particle a coating layer that contains an oxide of element $M^2$, so as to obtain the positive electrode active material; wherein
  when the positive electrode active material is in an 11% delithiated state, an average valence of element $M^1$ is $\alpha^1$, and an average valence of element $M^2$ is $\beta^1$;
  when the positive electrode active material is in a 78% delithiated state, an average valence of element $M^1$ is $\alpha^2$, and an average valence of element $M^2$ is $\beta^2$;
  $\alpha^1$ and $\alpha^2$ satisfy $\alpha^2 > \alpha^1$, and $\beta^1$ and $\beta^2$ satisfy $\beta^1 = \beta^2$; and
  element $M^1$ comprises one or more of Si, Ti, Cr, Mo, V, Se, Nb, Ru, Rh, Pd, Sb, Te, Ce, and W, and element $M^2$ is selected from one or more of Mg, Al, Ca, Zr, Zn, Y, and B.

15. The preparation method according to claim 14, wherein
  the mixture further comprises a precursor of element X, the obtained bulk particles are also doped with element X, and element X is selected from one or more of F, N, P, and S; or
  before mixing the bulk particles and the precursor of element M2, the preparation method further comprises:
  (c) mixing the bulk particles and a precursor of element X, and subjecting a resulting mixture to a sintering treatment to cause element X to be doped into the bulk particles, wherein element X is selected from one or more of F, N, P, and S.

16. The preparation method according to claim 15, wherein an atmosphere for the sintering treatment in step (a) is an oxygen-containing atmosphere; optionally, a percentage of oxygen in the sintering atmosphere ranges from 70% to 100%, optionally being more than 85%; a temperature for the sintering treatment ranges from 500° C. to 1000° C., optionally from 700° C. to 900° C., and further optionally from 750° C. to 850° C.; and duration for the sintering treatment ranges from 5 hours to 25 hours, optionally from 5 hours to 15 hours.

17. The preparation method according to claim 16, wherein an atmosphere for the sintering treatment in step (b) is an oxygen-containing atmosphere; optionally, a percentage of oxygen in the sintering atmosphere ranges from 70% to 100%, optionally being more than 85%; a temperature for the sintering treatment ranges from 100° C. to 550° C., optionally from 200° C. to 500° C.; and duration for the sintering treatment ranges from 3 hours to 25 hours, optionally from 5 hours to 10 hours.

18. The preparation method according to claim 15, wherein an atmosphere for the sintering treatment in step (c) is an oxygen-containing atmosphere; optionally, a percentage of oxygen in the sintering atmosphere ranges from 70% to 100%, optionally from 80% to 95%; a temperature for the sintering treatment ranges from 400° C. to 1000° C., optionally from 400° C. to 850° C., and optionally from 400° C. to 750° C.; and duration for the sintering treatment ranges from 3 hours to 25 hours, optionally from 5 hours to 10 hours.

* * * * *